(12) United States Patent
Spickelmire et al.

(10) Patent No.: US 6,431,388 B1
(45) Date of Patent: Aug. 13, 2002

(54) LIQUID STABILIZING BAFFLE

(76) Inventors: W. James Spickelmire, 724 S. "C" St.; John A. Bambacigno, 507 N. Idaho Ave., both of Grangeville, ID (US) 83530

( * ) Notice: Subject to any disclaimer, the term of this patent is extended or adjusted under 35 U.S.C. 154(b) by 0 days.

(21) Appl. No.: 10/050,335

(22) Filed: Jan. 15, 2002

Related U.S. Application Data

(63) Continuation-in-part of application No. 09/813,046, filed on Mar. 19, 2001, which is a continuation of application No. 09/533,065, filed on Mar. 22, 2000, which is a continuation of application No. 09/224,170, filed on Dec. 31, 1998, now Pat. No. 6,308,856, which is a continuation of application No. 09/073,891, filed on May 6, 1998, now Pat. No. 5,890,618.

(51) Int. Cl.[7] .............................................. B65D 25/00
(52) U.S. Cl. ..................................................... 220/563
(58) Field of Search ............................. 220/563, 4.14, 220/4.15, 734

(56) References Cited

U.S. PATENT DOCUMENTS

| | | | |
|---|---|---|---|
| 2,379,126 A | 6/1945 | Welden | 220/63 |
| 2,860,809 A | 11/1958 | Perry | 220/563 |
| 3,288,186 A | 11/1966 | Headrick | 150/0.5 |
| 3,349,953 A | 10/1967 | Conaway et al. | 220/85 |
| 3,804,292 A | 4/1974 | Chiti | 220/88 |
| 3,979,005 A | 9/1976 | Robinson et al. | 220/563 X |
| 4,013,190 A | 3/1977 | Wiggins et al. | 220/22 |
| 4,550,848 A | 11/1985 | Sucato | 220/22 |
| 4,796,773 A | 1/1989 | Gerhard | 220/563 |
| 4,858,778 A | 8/1989 | Patrick | 220/563 X |
| 4,927,045 A | 5/1990 | Lichka | 220/88 |
| 5,890,618 A | 4/1999 | Spickelmire | |
| 5,960,981 A | * 10/1999 | Dodson et al. | 220/563 |
| 6,062,417 A | 5/2000 | Evans | |
| 6,308,856 B1 | 10/2001 | Spickelmire | |

* cited by examiner

Primary Examiner—Steven Pollard
(74) Attorney, Agent, or Firm—Wells St. John P.S.

(57) ABSTRACT

A liquid stabilizing baffle is described in which first and second loops are formed, each by a strip of flexible spring-like material. When assembled, the first and second loops are joined together and intersect one another at two intersection points along an axis. A succession of at least two baffle units may be joined together by at least one loop of one unit passing through at least one loop of a successive baffle unit.

36 Claims, 26 Drawing Sheets

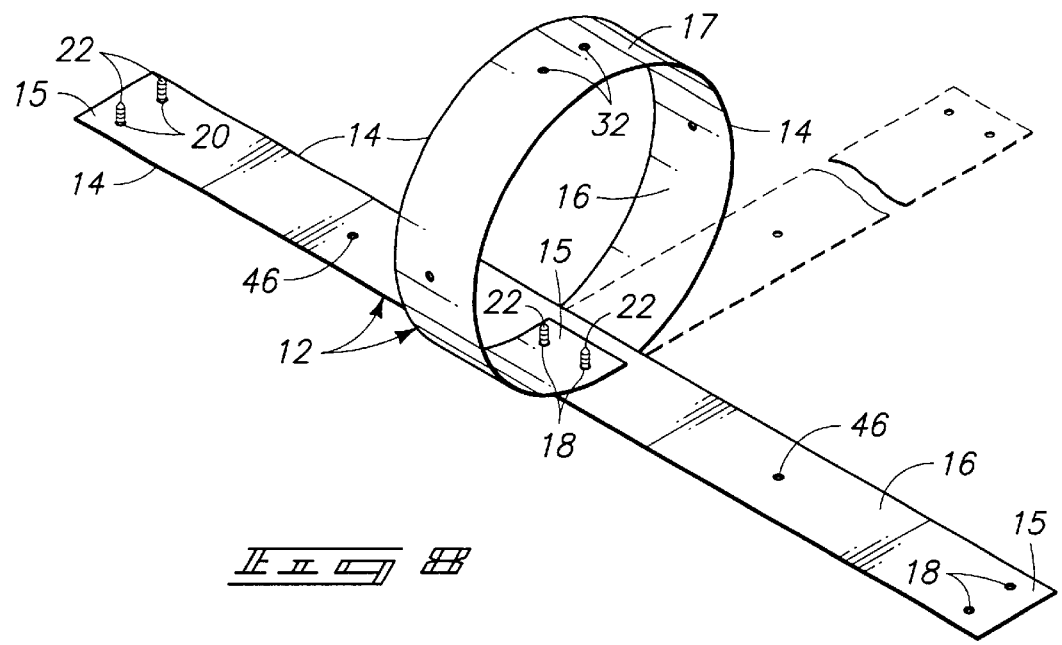
_FIG 8_
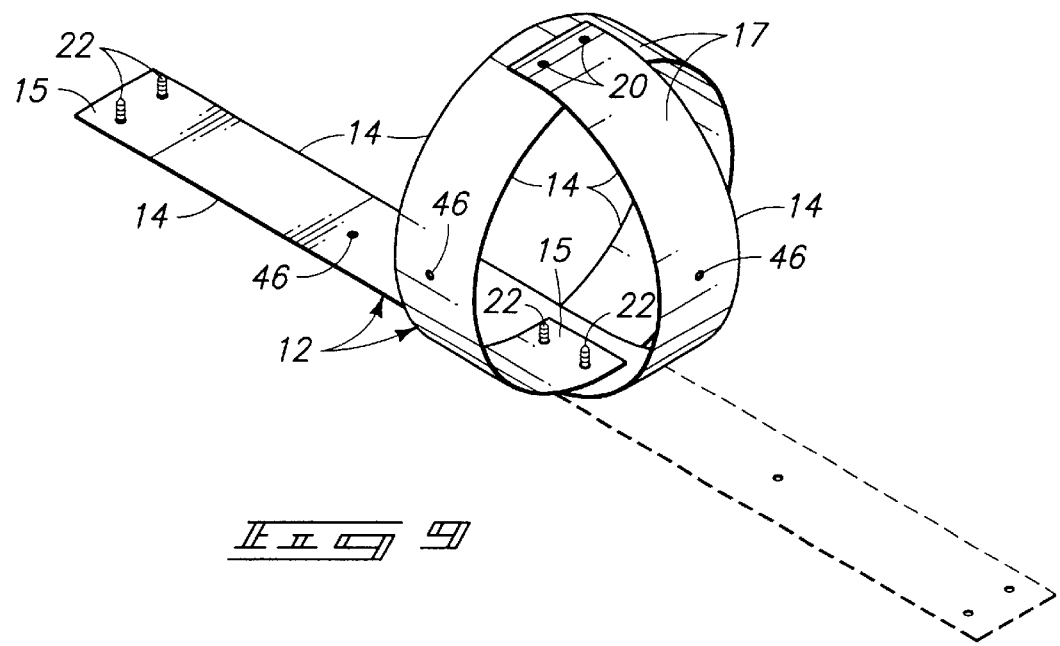
_FIG 9_

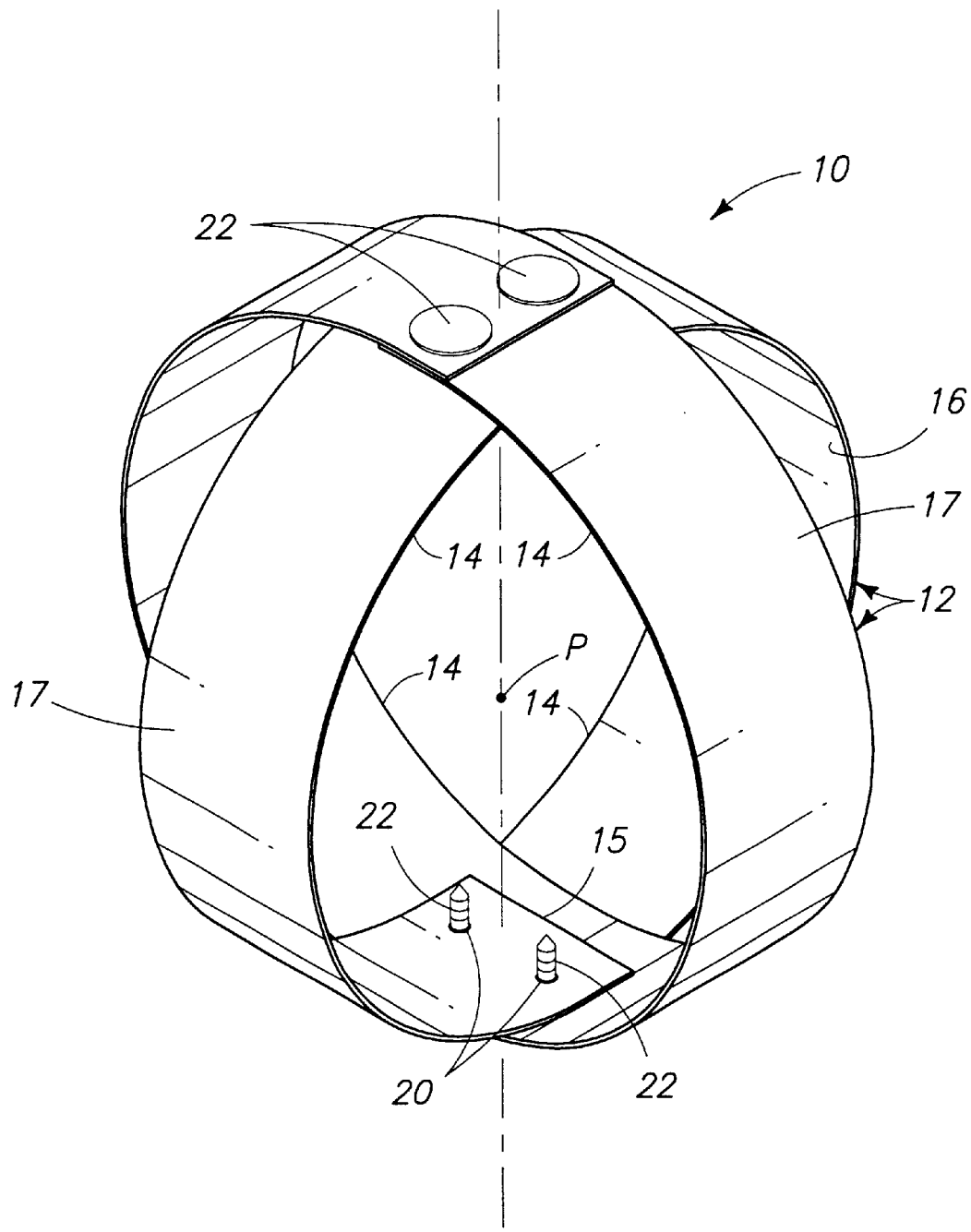

LIQUID STABILIZING BAFFLE

CROSS REFERENCE TO RELATED APPLICATION

This application is a continuation-in-part application based on co-pending patent application Ser. No. 09/813,046 filed on Mar. 19, 2001, and which is a continuation-in-part application based on application Ser. No. 09/533,065 filed on Mar. 22, 2000, which is a continuation-in-part application of parent application, Ser. No. 09/224,170 filed on Dec. 31, 1998, now issued as U.S. Pat. No. 6,308,856 which is a continuation-in-part application based on parent application Ser. No. 09/073,891 filed on May 6, 1998 now issued as U.S. Pat. No. 5,890,618. All of the above applications and patents are hereby incorporated by reference in this application in their entirety.

TECHNICAL FIELD

The present invention relates to stabilization of fluids using baffles.

BACKGROUND OF THE INVENTION

It has long been recognized that free flowing fluids can be dangerous to balance and control of vehicles. Tankers carrying less than full tanks of any fluid risk turnover when cornering, due to the centrifugal movement of the fluid to the outside dimension of the tank during the turn. The fluid weight will shift quickly and dramatically to the outside of the turn, upsetting the balance of the supporting vehicle. At best, this hinders proper vehicle control; at worst, the shifting weight will cause the vehicle to roll over.

Free fluid in smaller tanks also represents a problem even where weight shifting is not a serious problem. Shifting chemicals in a agricultural chemical tank, for example, can affect the application rate of the chemical. The chemical may shift away from the intake of the application pump, disrupting fluid flow to the pump even though sufficient fluid is available in the tank. Still further, sloshing fluids in tanks causes repeated stressing of the tank walls. Such repeated uneven stressing causes the material of the tank walls to gradually work-harden and fail.

Free fluid in nature in the form of waves and current may also be a great cause of erosion. Even structural seawalls and breakwaters may be broken and eroded by exceptional wave action that may occur during storms or flooding.

Clearly there has been a long felt need for an apparatus by which wave or fluid current forces may be dampened. The present apparatus is provided to fulfill this need as will be understood from the following description.

BRIEF DESCRIPTION OF THE DRAWINGS

Preferred embodiments of the invention are described below with reference to the following accompanying drawings.

FIGS. 7–10 are a succession of views illustrating a process for forming a preferred baffle from first, second, and third strips of spring material.

FIG. 28 is a view of a basic baffle configuration.

DETAILED DESCRIPTION OF THE PREFERRED EMBODIMENTS

Figure 1:
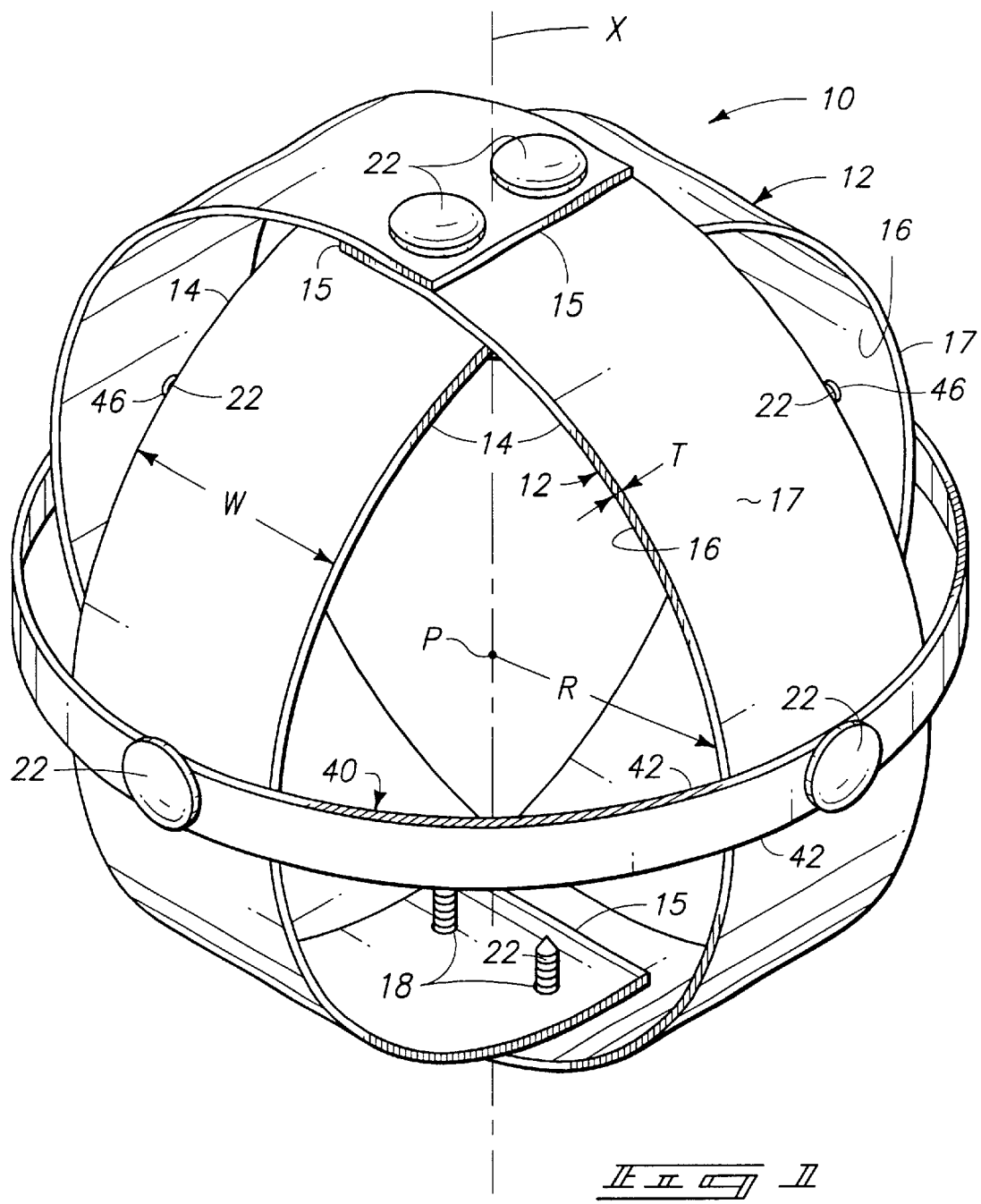
FIG. 1 is a perspective view showing a preferred baffle configuration.

This disclosure of the invention is submitted in furtherance of the constitutional purposes of the U.S. Patent Laws "to promote the progress of science and useful arts" (Article 1, Section 8).

GENERAL ASPECTS OF THE INVENTION

Before describing the various features of the invention in detail, general aspects of the invention will be described.

In a first aspect, a liquid stabilizing baffle 10 is comprised of first and second loops that are formed by strips 12 of flexible spring-like material that intersect one another at two points along an axis.

In another aspect, a liquid stabilizing baffle is provided in which first and second substantially circular loops are formed about an approximate center point P and are joined to one another at intersections along an axis. Each of the first and second loops are formed of flexible spring-like strips 12 at a radius R from the approximate center point P. The first and second loops each include substantially annular side edges 14 that are spaced apart by a width dimension W. The first and second loops each further include substantially concentric annular outer and inner surfaces 16, 17 that join substantially annular side edges 14 and span the width dimension W. The inner and outer surfaces of each first and second loop are spaced apart radially with respect to the approximate center point P by a thickness dimension T. The thickness dimension T is less than the width dimension W and the width dimension W is less than the radius R. Fasteners 22 join the first and second loops in intersecting, substantially concentric relation, forming a hollow spheroidal cruciform configuration.

In a further aspect, a liquid stabilizing baffle 10 is provided and comprised of substantially circular first and second loops that are formed of flexible spring-like plastic strips on substantially equal radii R from a central point P. The loops intersect one another at angles to form a substantially three dimensional hollow spheroid cruciform configuration. The first and second loops each include substantially annular side edges 14 that are spaced apart axially by a width dimension W. The first and second loops also include substantially concentric annular outer and inner surfaces 16, 17 that join the side edges 14 and span the width dimension W. The inner and outer surfaces 16, 17 are spaced apart radially by a thickness dimension T. The thickness dimension T of each loop is less than the width dimension W thereof and the width dimension W is less than the radius R thereof. Each strip is elongated between opposed ends. The ends of one strip are joined together with the other strip at a point approximately midway between ends of the other strip.

A further aspect of the present invention includes a liquid stabilizing baffle 10 that is comprised of first and second loops that are formed by first and second strips of flexible resilient material, with each strip formed in a loop configuration. The first and second loops are interlinked with one another at two intersection points along an axis, forming a substantially hollow spheroidal cruciform configuration.

In a still further aspect, a liquid stabilizing baffle kit is provided with component parts including first and second strips 12 of flexible resilient material with width dimensions W between longitudinal side edges 14 and thickness dimensions T between opposed inner and outer surfaces 16, 17. The strips also include opposed strip ends 15. Fasteners 22 are configured to join the strip ends 15 together in intersecting resilient loops with the thickness dimensions T oriented radially and with the width dimensions W substantial tangential.

In a still further aspect, a liquid stabilizing baffle system is provided, comprised of a succession of baffle units 10, each unit being formed of first and second elongated strips 12 of flexible resilient material having width dimensions W between longitudinal side edges 14, and thickness dimensions T between opposed inner and outer surfaces 16, 17. The strips 12 of each baffle unit are formed in intersecting loops that are joined to form substantially hollow spheroid cruciform configurations. At least one of the strips 12 of one baffle unit is linked through at least one of the loops of a successive adjacent baffle unit.

DETAILED DESCRIPTION

The above are representative of various general embodiments of the invention, more specific details of which will now be discussed.

Preferred forms of the liquid stabilizing baffle 10 are shown in FIGS. 1–28. A system in which a plurality of individual baffles 10 in this form may be provided is partially shown in FIGS. 2 and 3, and further forms as indicated by FIGS. 11–28 may be used to advantage in similar environments.

Figure 6:
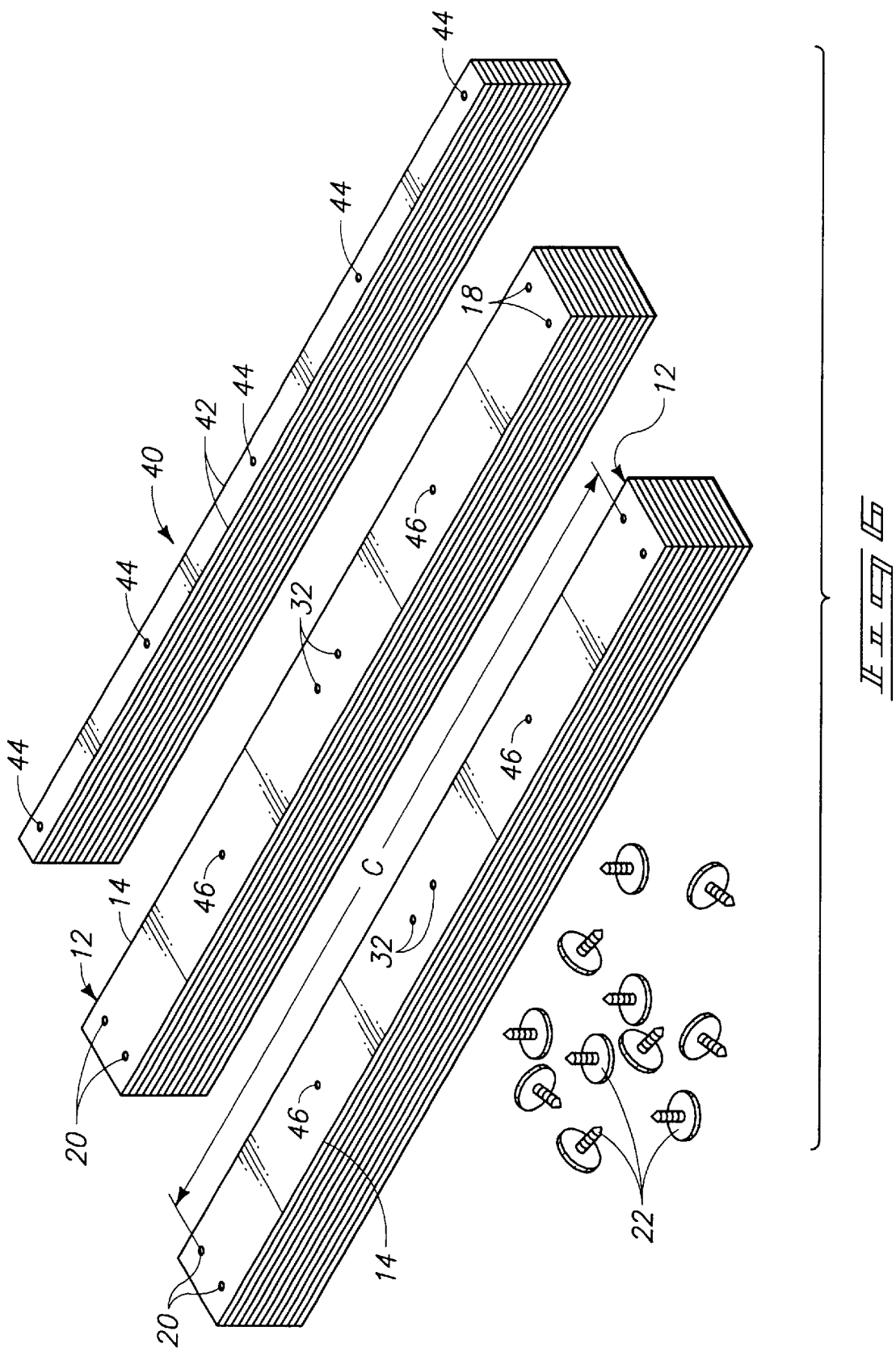
FIG. 6 is a perspective diagrammatic view illustrating components of the preferred baffles in kit form.
Figure 7:
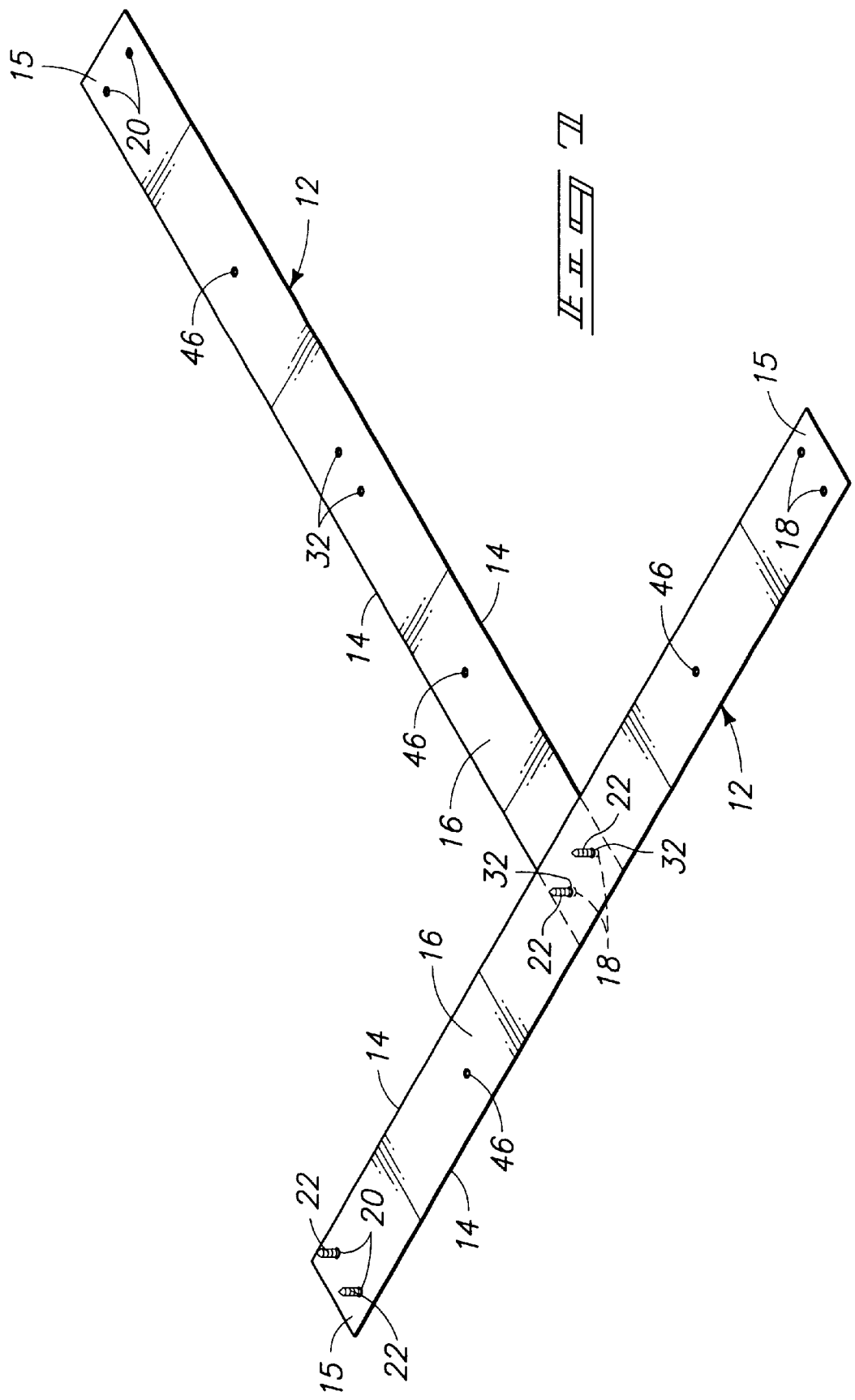
Figure 11:
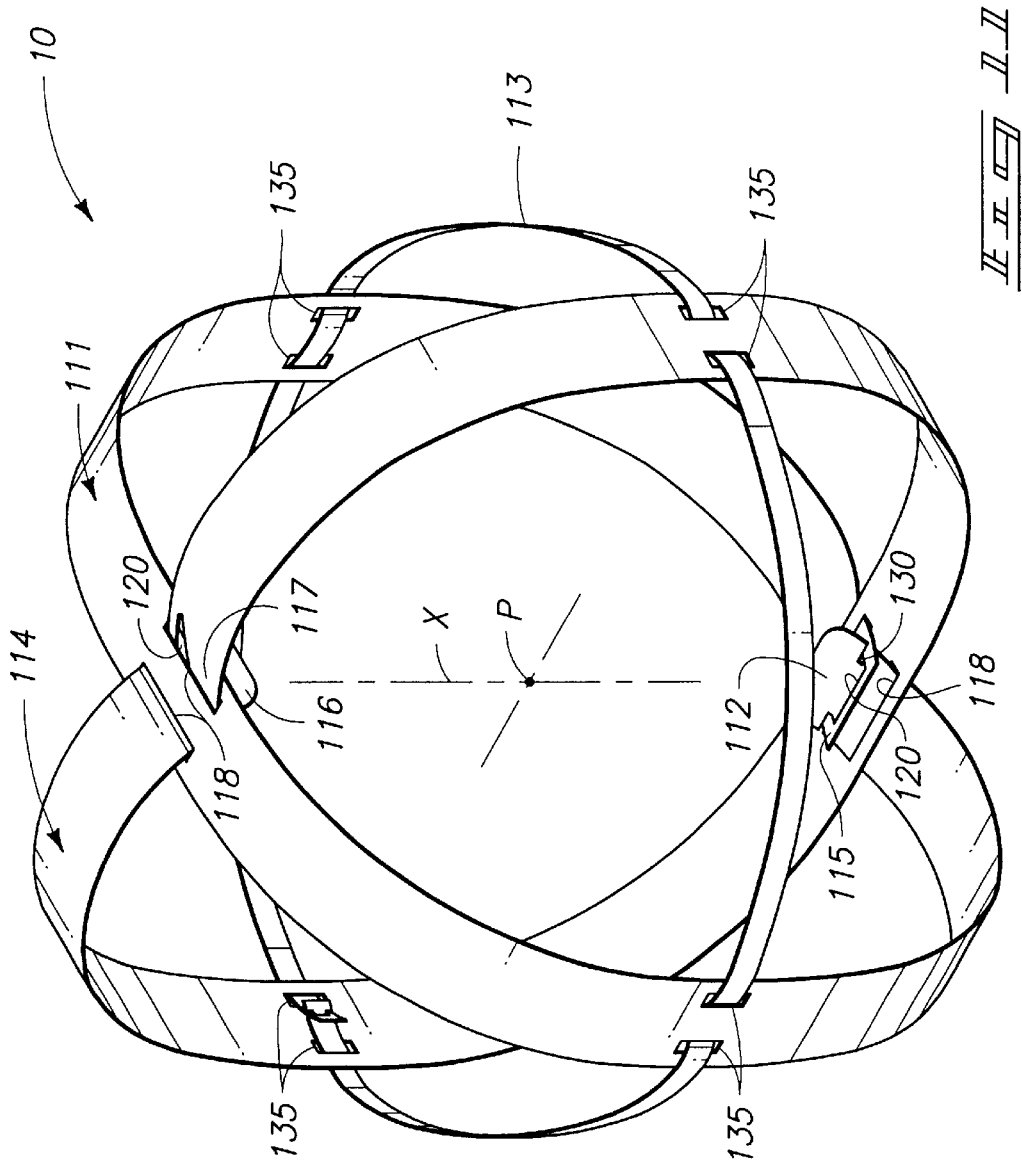
FIG. 11 is a perspective view of a preferred form of baffle configuration in which the strips of resilient material are interlinked together.
Figure 12:
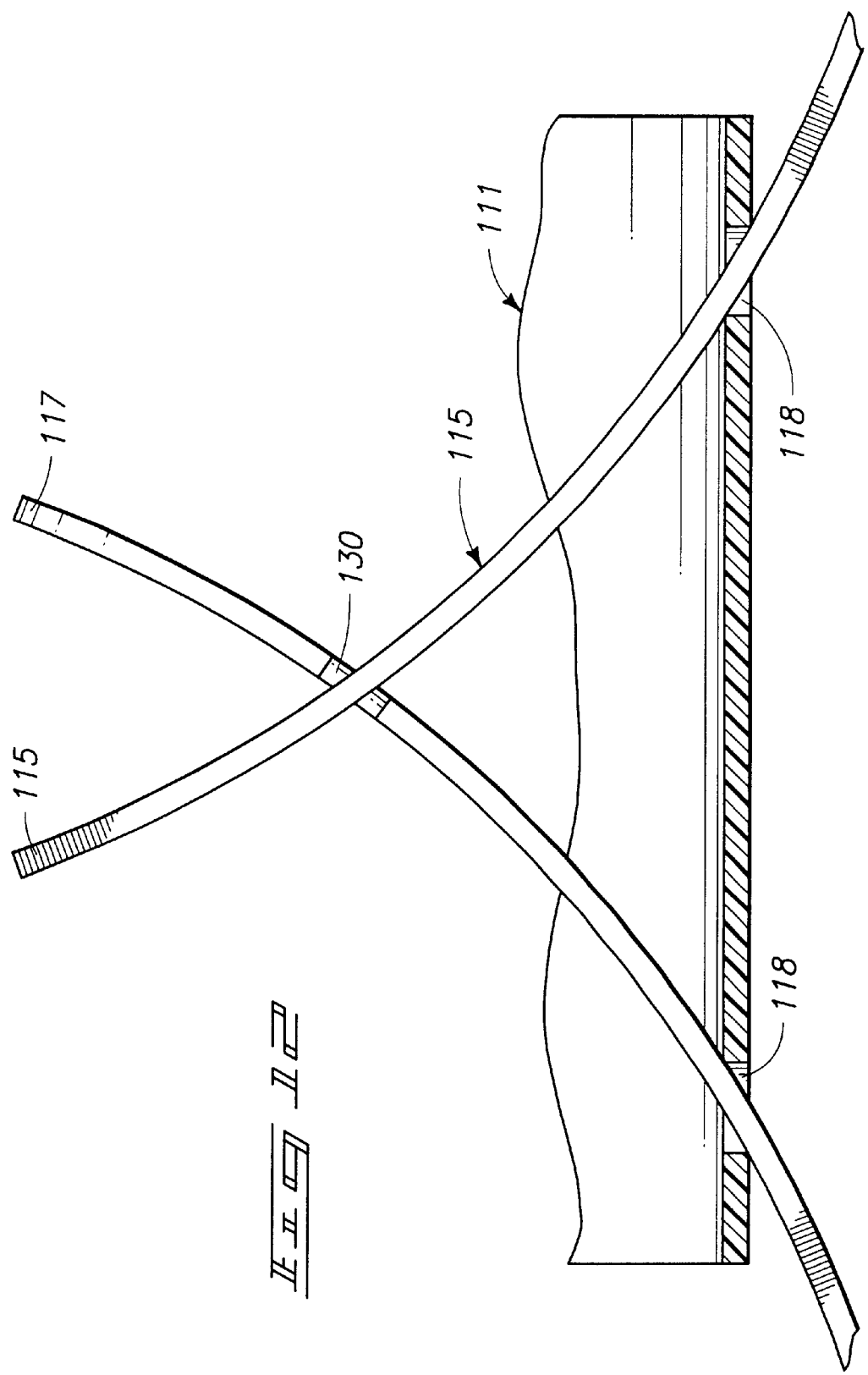
FIG. 12 is an enlarged fragmented view showing interlinked strip ends in a flexed condition.
Figure 13:
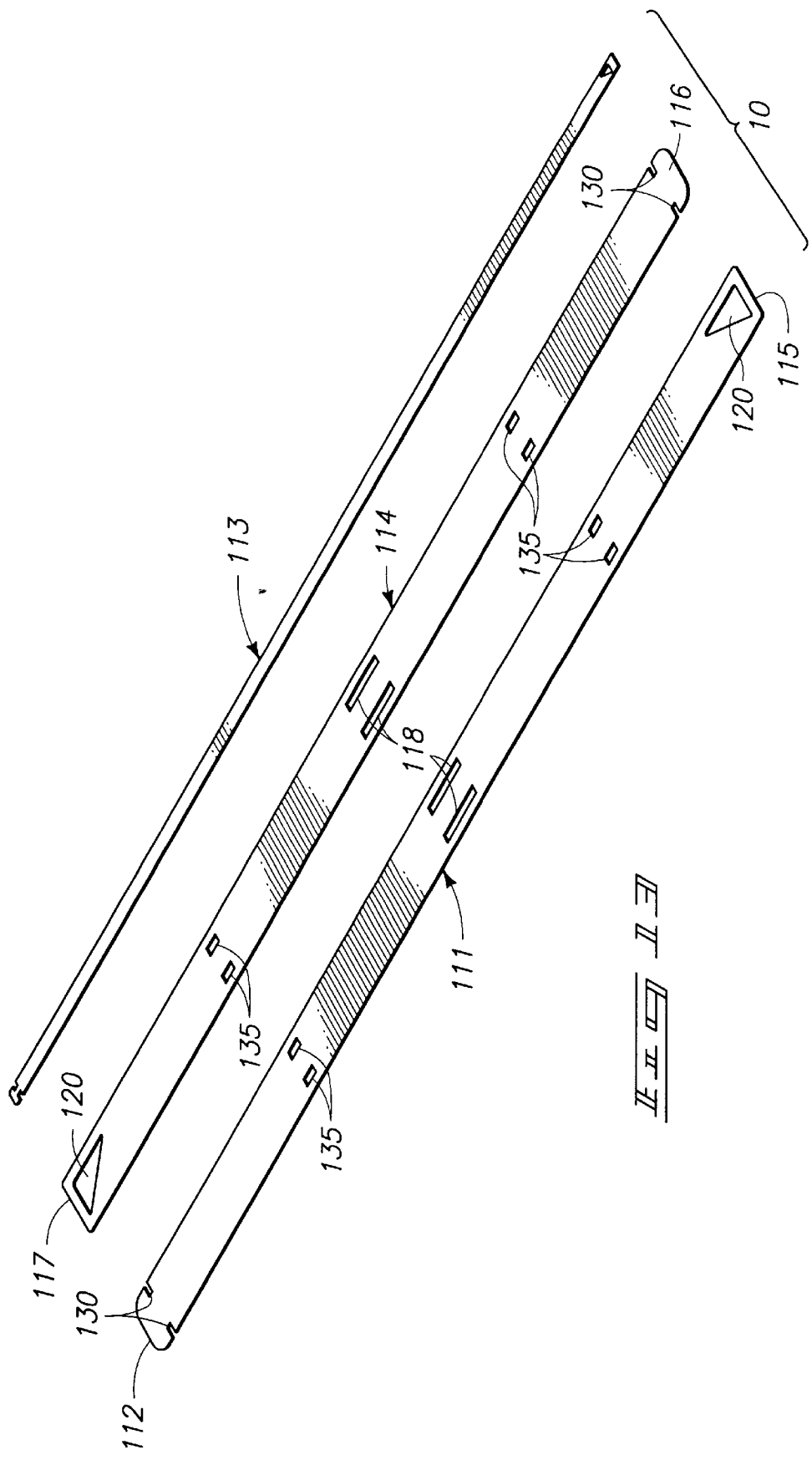
FIG. 13 is a perspective view of first, second, and third resilient strips as a kit for producing the baffle configuration shown in FIG. 11.

Each baffle 10 may be provided pre-assembled as illustrated in FIGS. 1, 11, or 28; or be provided as a kit, ready for assembly, as exemplified by FIGS. 6 and 13 and as taught in other applications that are incorporated by reference herein. The baffles 10 in preferred forms, may therefor be assembled or are pre-assembled in three dimensional hollow cruciform spheroid shapes, as generally indicated by the basic baffle form shown in FIG. 28, in three loop configurations as exemplified by FIGS. 1 and 11, in interlinked arrangements as exemplified by FIGS. 24–27, or in forms shown in the applications incorporated by reference herein.

It may be preferable to use the present baffles 10 individually. However, if desired, the baffles may be connected together in a strand or in multiple strands. For example, the interlinked baffle units shown in FIGS. 24–27 may be provided in indefinite length strands, or such strands may be provided by threading successive baffle units on a cable or other form of connector as exemplified in applications incorporated by reference herein.

By way of example, a number of rows of the baffle components could be made into a flat rectangular matrix, or a series of rows and columns could be formed into a cubic configuration. The combination of configurations is almost without limit.

In presently preferred forms, the present baffle 10 includes substantially similar first and second loops that are each made up from an elongated strip that is formed of a resilient flexible spring-like material such as polyethylene plastic (FIG. 28). In other preferred forms, a third loop may be added as shown generally in FIGS. 1 and 11.

It has been found that polyethylene is a desirable material for the strips since the material is relatively impervious to most liquids. Further, polyethylene may be produced to include resilient or spring-like properties that are most desirable for the desired energy absorbing effect. Though polyethylene is preferred, polyvinyl chloride, nylon, stainless steel or other resilient sheet or strip materials may also be used.

In the embodiments illustrated, general overall configuration and dimensions may be similar or at least substantially proportional. Description of the relative dimensions and relation of the strips for the FIG. 1 or FIG. 28 embodiments will thus suffice for description of the embodiments shown in the remaining drawing figures.

Each of the first and second strips 12 is preferably rectangular, including longitudinal side edges 14 joining opposed ends 15. The strip includes a preferred width dimension W (FIG. 1) extending transversely of the strip length between the sides 14. The width dimension may vary according to need, but will remain within an approximate relationship with the size of a loop formed by bending the strip until the ends 15 are adjacent one another.

While the above strip configurations are presently preferred, it is possible, if desired, that a baffle units be made with strips 12 of different width dimensions W and length dimensions. An "hourglass" shape, for example is a possible alternate configuration along the strip lengths.

The radius of a loop formed by either of the strips is indicated at R (FIG. 1), and the thickness between inside and outside surfaces 16, 17 respectively is designated at T. The thickness dimension T is thus a substantially radial dimension and the surfaces 16, 17 that span the width W are substantially tangential to the generally spheroid shape.

Of course, the length dimension or circumference C (FIG. 6) of the strips 12 will vary depending upon the desired radius R of the loops to be formed, according to the formula $C=2\pi R$. Using the above dimensional indicia, the width W is preferred to be no greater than approximately 0.6R, and the thickness T is preferably less than the width, advantageously approximately 0.0125R.

Thus by way of example, a strip 12 formed into a loop having a radius R of 5 inches will preferably have a width dimension W of approximately 3 inches and a thickness dimension T of approximately 0.0625 inches. Likewise, a strip 12 formed into a loop having a radius of 36 inches may have a width W of up to 21.6 inches (though a smaller width dimension is preferred) and an approximate maximum thickness dimension T of 0.45 inches. This relationship is given for the preferred polyethylene strip material and has been found to be preferred for obtaining the maximum fluid energy absorption results known at the present time.

Each strip 12 preferably includes joint members that, in general, are used to secure the strips in the intersecting loop configurations. In illustrated examples (FIGS. 1–10 embodiments) such joint members include at least one, and preferably a pair of end holes 18, 20 formed inwardly adjacent each end 15. Preferably, there are two pairs of such holes 18, 20 at either end of each strip. The exemplified holes are spaced apart across the strip at equal distances. In the illustrated example, the end holes 18, 20 are provided to receive barbed or other appropriate fastener members 22 which are exemplary components of the joint members and are used to secure the first and second strips together and, preferably, to lock the intersecting strips against rotation relative to one another.

In the preferred form shown in FIG. 6, the joint and link members include fastener members 22 in the exemplary form of one-way brads with barbed external shanks that may be pressed through the holes but that will not permit easy removal. Other forms of fasteners such as nut and bolt combinations rivets, cotter pins, nails, screws, and the like may also be used. A further preferred joint and link member configuration is specifically shown in FIGS. 11–23 will be described in greater detail later in this specification.

Figure 2:
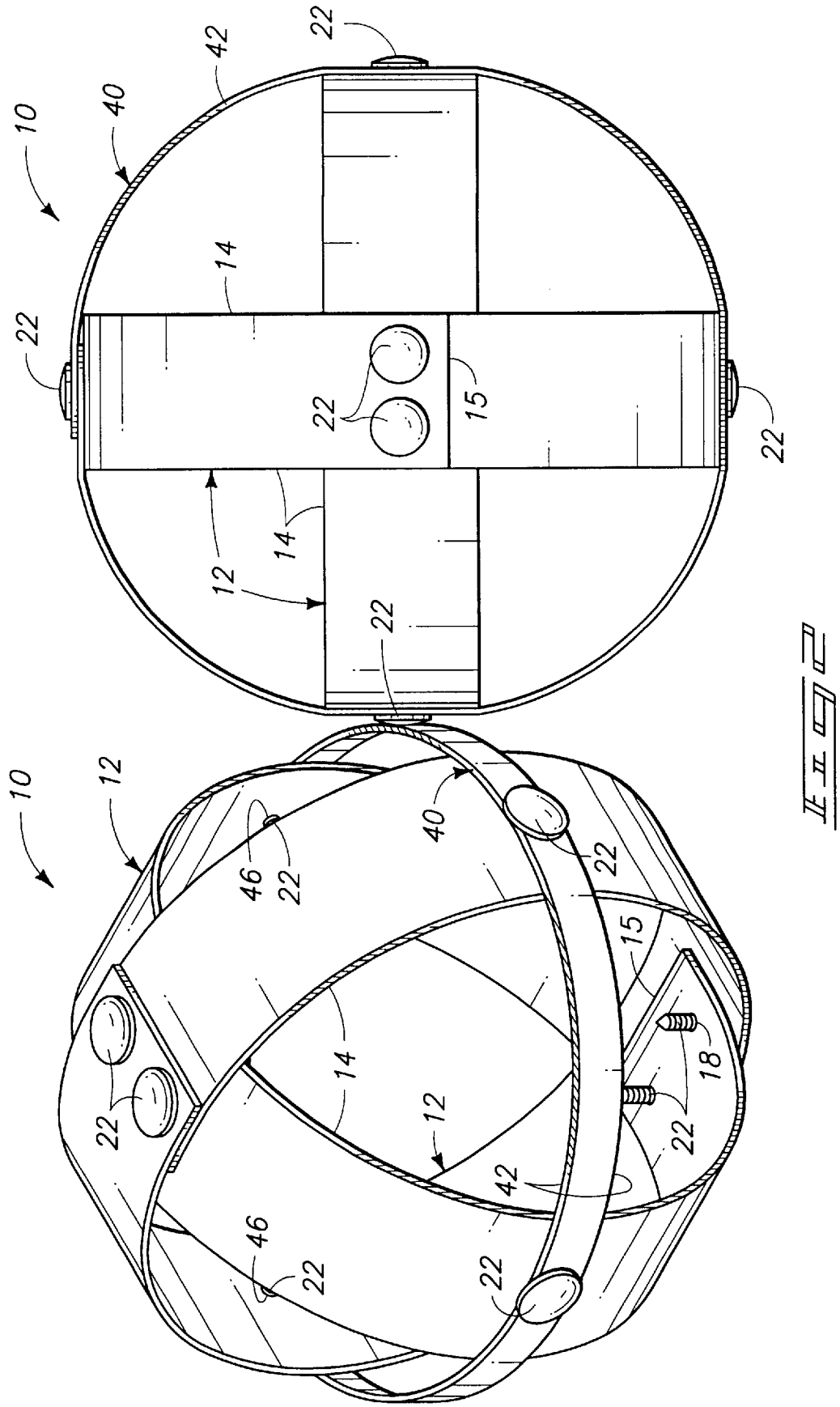
FIG. 2 is a side elevation view showing two baffle units engaging one another, with the present third ring preventing the baffle units from nesting together.

In the preferred forms, each of the strips 12 are foldable into a loop configuration with the ends 15 in close proximity or overlapping and, in the FIGS. 1–10 and 28 examples, with the end holes 18, 20 aligned to receive at least one and more preferably two of the fastener members 22 (FIG. 2). The fastener members 22 secure the strip materials in the loop configurations which, due to the inherent resilient nature of the material, will deform upon application of force but will spring back to the formed loop configuration.

In a preferred embodiment link members in an exemplary form of a central hole, or more preferably a pair of holes 32 are provided, at the approximate longitudinal center of each strip on either side of a longitudinally centered hole 24. These holes 32 are longitudinally aligned and spaced apart the same distances as the spacing between the end holes 18 and 20 to permit two of the strips to be formed together with the loops intersecting and held in a cruciform configuration as shown in FIGS. 1 and 2.

As shown in FIG. 1, and others, the first and second loops of each baffle unit intersect at two points along an axis X. The axis X passes through the intersecting points and is at least adjacent to the approximate centers of the loops. It is pointed out that the loops may be slightly out of round (not perfectly circular), and that the centers P may be slightly offset from one another. However, such minor differences will not have significant effect so long as the loops are joined to one another and the centers are in proximity to the axis X.

Interconnection of two of the strips to form the preferred configuration is easily and quickly accomplished, as may be understood from the succession of illustrations in FIGS. 7–10. First, two strips 12 may be arranged in a T-shaped orientation (FIG. 7) with the end holes 18 of one strip aligned with link members in the form of central holes 32 of the other strip. The exemplified barbed fastener members 22 may then be pushed through the aligned holes 18, 32 of the two overlapping strips. Additional fasteners 22 may also be pushed up through end holes 20 in one of the ends of the cross part of the T shape.

Next, the free end of the leg of the T configuration is bent over (FIG. 8) into a substantially circular form. The end holes 18 at the bent end of the strip may be secured to the projecting ends of the fastener members 22 that presently extend through the central holes 32 and end holes 18 at the juncture of the "T" shape. The first loop is now formed, along with the first intersection of the loops.

Next, a free end (without fasteners) of the remaining strip 12 may be bent over (FIG. 9) and be positioned with the end holes 20 aligned with the central holes 32 in the previously formed loop. This end is held in place while the remaining strip end is bent up and over until the fasteners can be inserted through the aligned central and end holes. The fasteners 22 may be pushed down through the aligned holes to complete formation of the second intersection and the second loop. A substantially circular cruciform configuration is thus formed.

The two loops now intersect at substantially right angles and points of intersection lie substantially along the axis X. It is noted that the ends of the strips are preferably lapped over and under the first formed loop, and that the first formed loop ends are lapped over and under the second strip (see FIG. 8). The overlapping configuration allows for flush engagement of the strip ends with both inner and outward side surfaces at the center of the other strip, and results in a substantially consistent loop configuration with the loops intersecting at approximate right angles that are locked against relative rotation about the axis X by the fasteners 22.

It is noted that there are gore shaped open spaces between the first and second loops. These spaces could allow nesting of adjacent baffles, especially in a confined space. This may be an acceptable situation if sufficient baffles are available for use and if the volume (displacement) occupied by a nested accumulation of baffle units is not a critical consideration. If baffle nesting is undesired, third loops may be provided to span the open spaces.

FIG. 2 illustrates a third loop on one baffle functioning to keep the loops of an adjacent baffle from entering the adjacent open space. The third loop thus allows the baffles to function well even in confined spaces where the individual baffles are independent (not linked together).

Again, in the preferred forms shown in FIGS. 1–10, a preferred third loop is formed of a flexible spring material strip 40 that is joined with the first and second loops at points along the axis between the intersection points of the first and second loops. Preferably, the third loop is mounted substantially midway along the axis X between the two intersecting points of the first and second loops. It is also preferable that the third loop be formed at substantially right angles to the first and second loops.

The third loop may be formed of the same spring-like materials as the first and second loops. It may be of the same thickness dimension, or have a different thickness depending upon the nature of intended use. It may also have a different configuration than the generally rectangular shape shown.

The preferred third loop will be formed of a strip 40 of a sufficient length to circumscribe both intersecting loops (see FIG. 2). It is preferred in the exemplary configurations of FIGS. 1–10, that the third loop extend about the outside surfaces of the first and second loops, so the engaged first and second loop surfaces will reinforce the third loop against radial inward collapse.

It may be noted that the illustrated strip 40 forming the third loop is narrower between longitudinal side edges 42 than the first and second loops. The width dimension may vary, however, up to the same approximate widths as the first and second loops. Also, as indicated above, the thickness dimension may vary according to need, but is preferably about the same thickness as the first and second strips 12.

Figure 3:
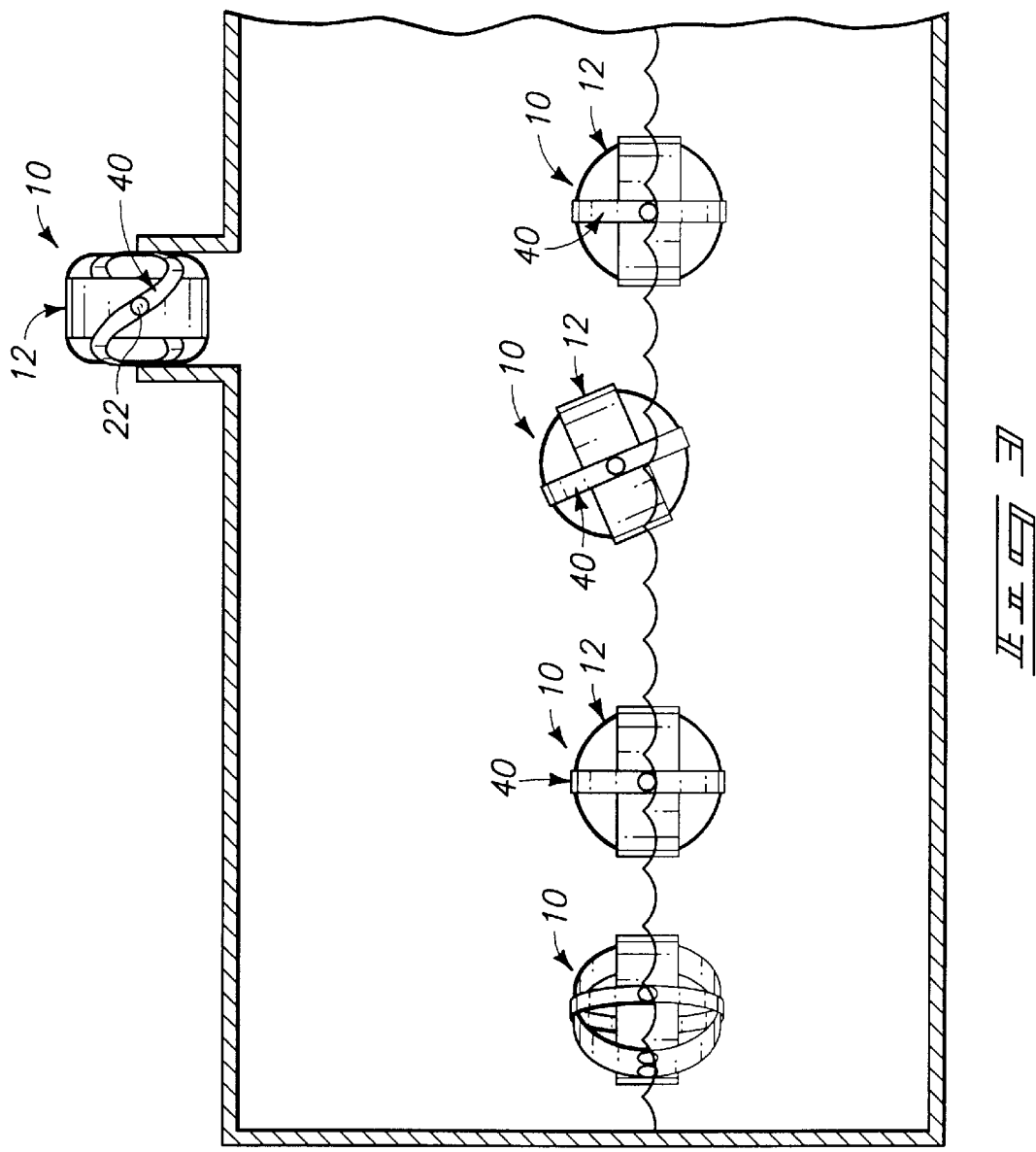
FIG. 3 is a diagrammatic operational view illustrating baffle units in a tank, with the first and second loops of a baffle being compressed and a third loop being twisted to fit through the tank opening.
Figure 4:
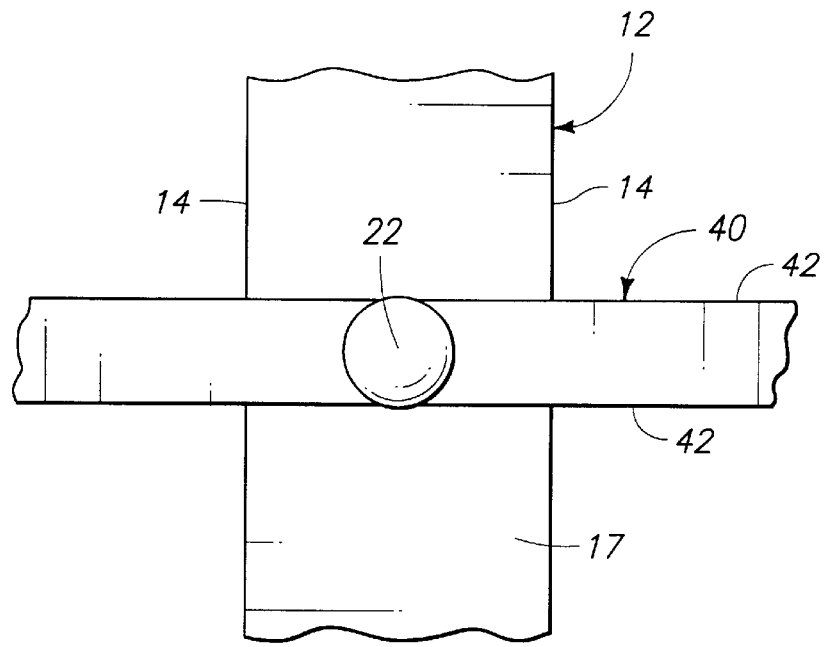
FIGS. 4 is an enlarged fragmented view of the third ring in a normal orientation.

Narrow third loops may be preferred in instances where the baffles are to be inserted into tanks (FIG. 3) through narrow openings. The narrow strip 40 (being flexible and easier to bend than the first and second loops) may be easily twisted (compare FIGS. 4 and 5) to narrow the overall baffle diameter (FIG. 3). The illustration indicates several baffles 10 in a tank. However it may be desirable to loosely fill the tank with such baffles.

Figure 5:
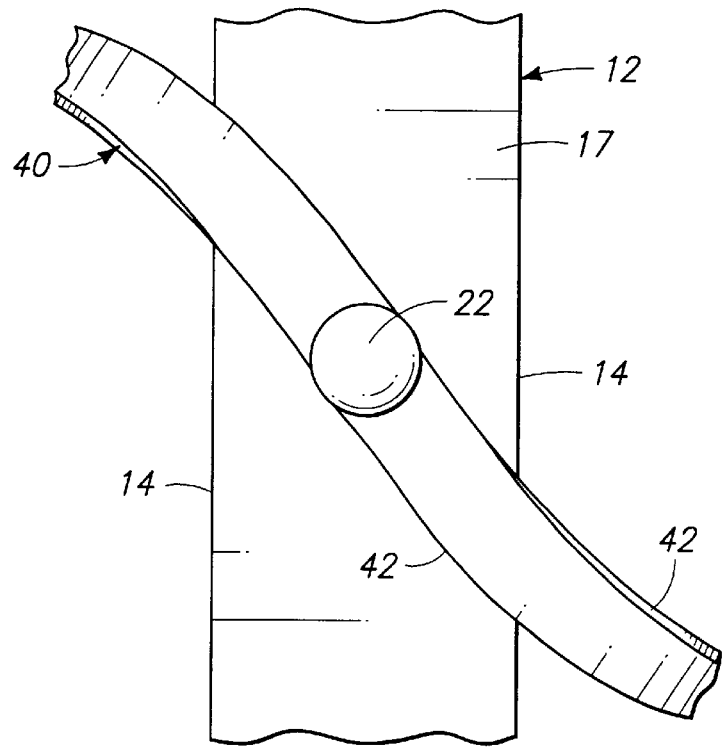
FIG. 5 is an enlarged fragmented view of the third loop in a twisted orientation.

The third loop is preferably pivotably joined to the first and second loops. In this form, it is preferable that the pivot points are provided at all four points where the third loop intersects the first and second loops. The pivots may be formed by more of the same fastener members 22, pressed through holes 44, formed through and substantially equally spaced along the third strip 40. Holes 46 are provided in the strips 12 and are centered between the end holes 18, 20 and center holes 32, for alignment with the third loop holes 44. Single fasteners 22 are fitted through aligned holes 44, 46, preferably at each of the four intersections, to allow the third loop to pivot when compressed and twisted as shown in FIGS. 3 and 5.

Figure 10:
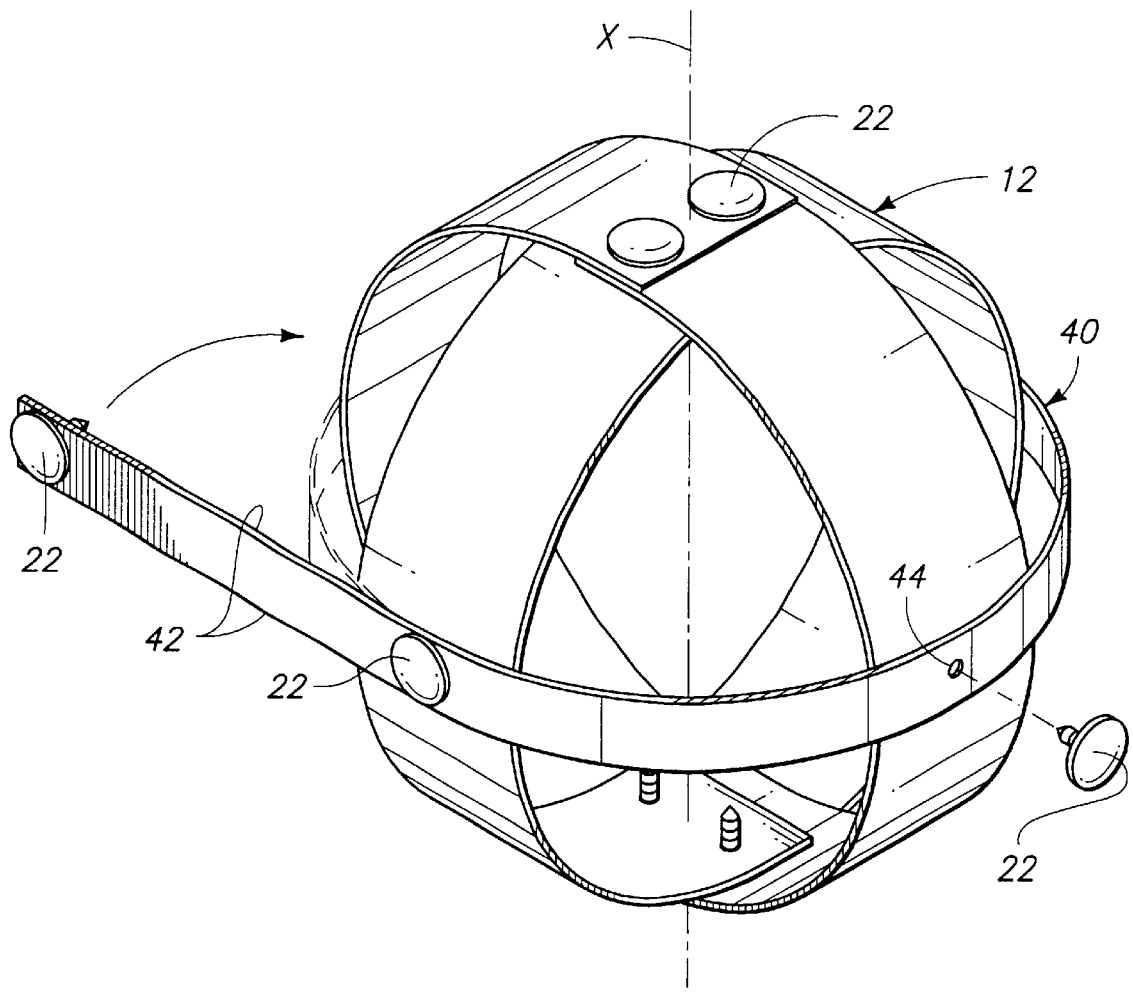

FIG. 10 shows connection of the third strip 40 to the previously formed first and second loops. One end of the third strip is positioned with an end hole 44 aligned with one of the holes 46 formed in one of the first or second strips. The strip end is held in place as the remainder is bent around the first and second loops so the remaining holes 44 move into alignment with the successive holes 46. Fastener members 22 may then be inserted through the aligned holes. The free end of the strip is bent so the end holes 44 align with the adjacent remaining hole 46 in the first or second loops. The ends will overlap as shown in FIG. 2, and a fastener member 22 may be inserted through the aligned holes to complete the baffle.

Details with respect to the embodiments illustrated in FIGS. 11–23 will now be discussed more specifically.

In the preferred configurations shown in FIGS. 11–23, first and second strips 111, 114 are foldable into loop configurations with ends 112, 115 and 116, 117 interlinked and wherein integral shapes formed within the strips themselves serve as fastener or joint members 120, 130 for securing the strip ends. Further, it is preferred that integral link members 118 be provided to enable mounting of the strips in intersecting relation. Otherwise, the individual strips may be formed of substantially the same material and include substantially the same dimensions as described above for the strips in the configurations shown in FIGS. 1–10 and 28.

FIG. 13 illustrates three strips which may be considered a first strip 111, a second strip 114, and a third 113 strip that can be formed and interlinked to produce the baffle configuration shown in FIG. 11. It is pointed out however that as few as two first and second strips may be interconnected using the exemplary fastening arrangements to form a baffle unit.

The steps to accomplish formation of a two loop baffle and a three loop baffle this are shown sequentially in FIGS. 14–22.

Each of the first and second strips include joint members 120, 130 at opposed ends that are preferably integrally formed by female and male portions that may be selectively joined to form the loop configurations. Further, each of the first and second strips 111, 114 include link members 118 in the form of slots that are intermediate the ends for slidably receiving the third strip.

Preferably, the first and second strips each include three sets of slots, with the link member 118 provided as a central set of slots shaped to receive the ends of the other loop. These slots thus cooperate as may be understood from the drawings, to secure the two loops in substantially perpendicular orientation in the "cruciform" configuration described previously.

The exemplified central slots 118 allow interlacing of the first and second strips substantially as shown. The result may not be a perfectly circular loop configuration, but with portions between intersecting points that tend to bulge outwardly. These portions, due to the somewhat "crimped" condition of the strip material adjacent the slots, are somewhat more resistant to bending than would be expected for a simply circular loop configuration. Thus, one strip of material reinforces the other at the general locations of the intersecting points.

Figure 18:
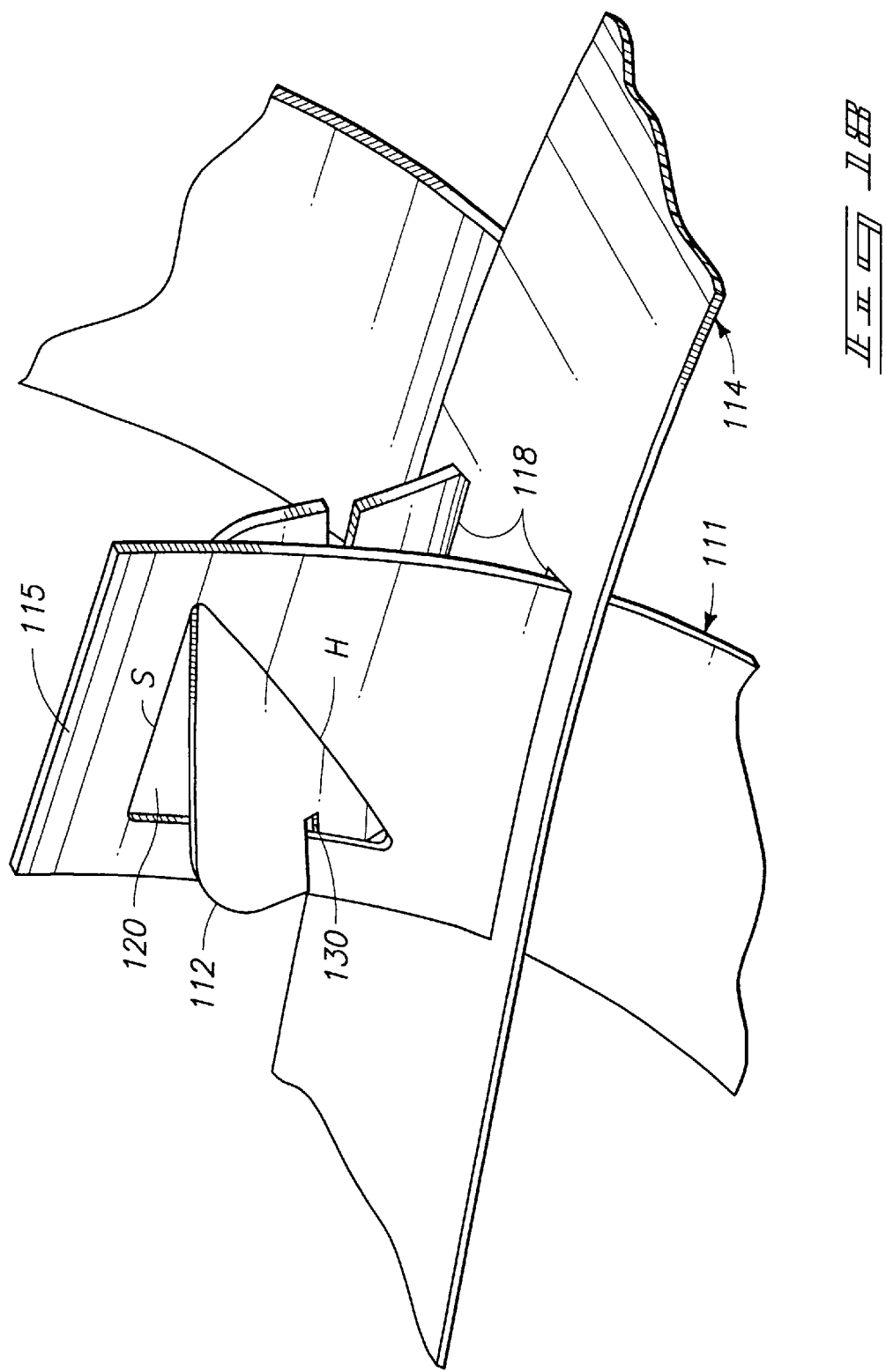

The slidable nature of the strip ends at the strip intersections allows for the loops to flex in the manner shown in FIG. 18. This action, which may occur when the baffles are flexed during operation, has a tendency to self-clean the intersecting points so that the adjacent areas will not become impacted with materials when in use.

The joint members, in preferred forms, may also include a triangular opening 120 formed at one end of each strip, and a latch member 130 formed at an opposite end. The triangular opening 120 is provided with the hypotenuse side H (FIG. 18) of the triangle shape having a dimension greater than the width dimension of the associated strip, at least at the end thereof. Thus, the opposite strip end, with latch member 130, can be fitted through the triangular opening 120 as shown partially in FIG. 18, by twisting the ends and fitting the latch end through the triangular opening along the hypotenuse portion H thereof.

Insets or notches may be formed on opposed side edges of the strip to form the male latch member 130. The dimension across the strips at the inset or notch configurations is slightly less than the side S (FIG. 18) of the triangular opening opposite to the hypotenuse. With this relationship, the latch member 130 can be mechanically secured within the triangular opening with the further capability of disassembly simply by reversing the assembly procedure.

As noted in FIG. 18, it is preferable that the joint members 120, 130 be situated adjacent to the link members 118. Thus, as exemplified, the link members 118 on one of the strips are slidably received by the joint members 120, 130 of the other strip. Most preferably, the interconnected joint members are received through the slots forming the link members 118 such that the joint formed between is situated inward of the formed loops. Thus, the slot configurations forming the link members also serve to substantially lock the joined ends in place and secure the loops against unintentional or accidental disassembly.

The baffles 10 described to this point for all illustrated embodiments may be comprised of simply the first and second loops (without the third loop 113). However, it may be preferred that the third loop 113 be provided in order to span the "gore" shaped openings between the first and second loops. The third loop, as described earlier may preferably oriented substantially perpendicularly to the first and second loops. It is also preferable, at least in certain forms, that the third loop be formed of a resilient strip that is narrower than the first and second strips.

In the embodiments illustrated in FIGS. 11–23, the third strip 113 may be similar in configuration at opposed ends, to the first and second strips. That is to say, the third strip may include a triangular opening at one end, and a latch member at opposite end. The first and second strips are provided with pairs of slots 135 that are situated between the central slots and the strip ends. These slots are intended to slidably receive the third strip 113. The third strip is interwoven with the slots 135 at four points around the interconnected first two loops substantially in the manner shown at FIG. 11. The opposed ends of the strip 113 are connected in a manner similar to that shown for the first and second strips and as graphically indicated at FIGS. 17 and 18.

Figure 14:
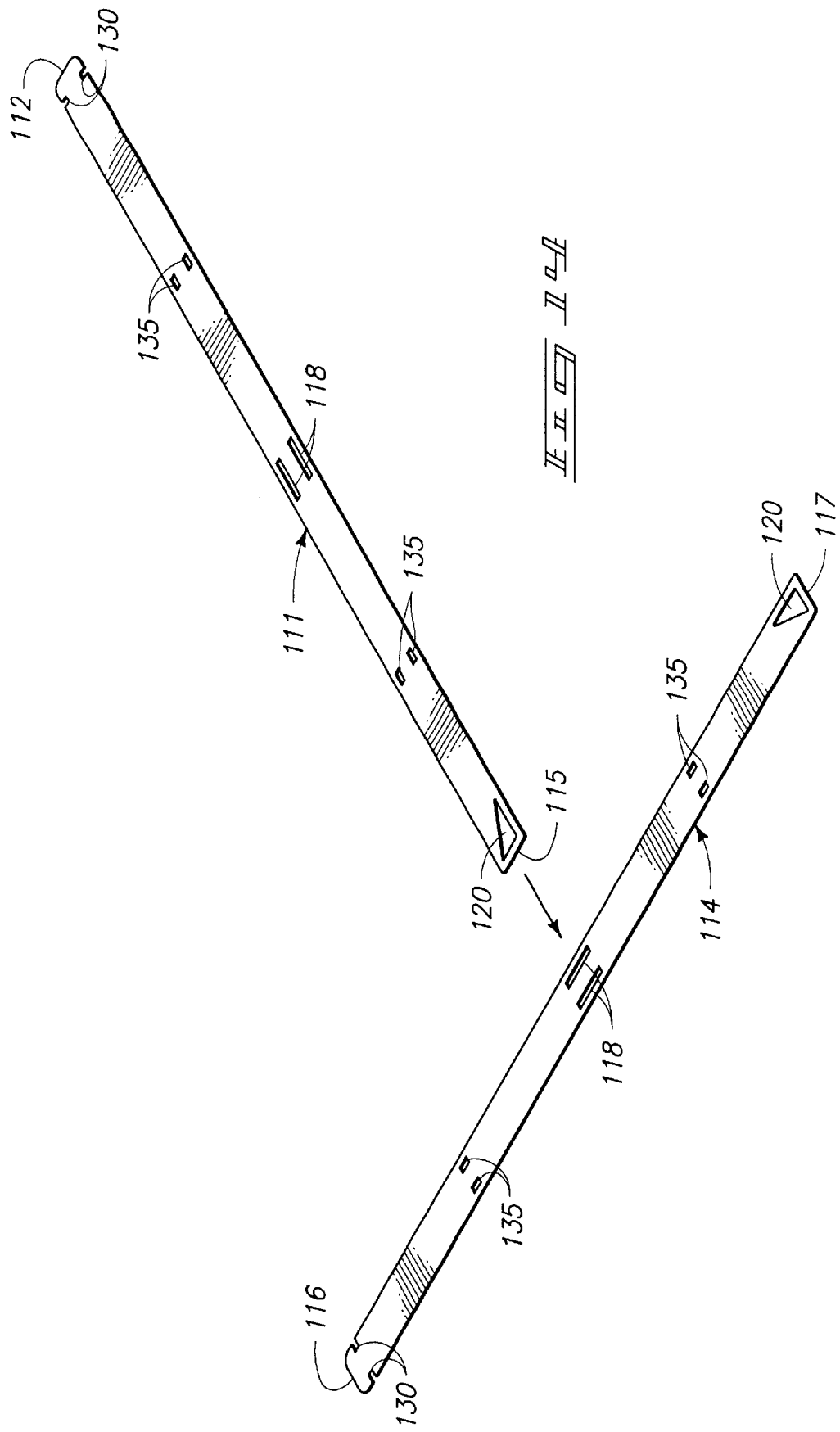
FIGS. 14–22 show a succession of steps that may be taken in assembling the strips shown in FIG. 13.
Figure 15:
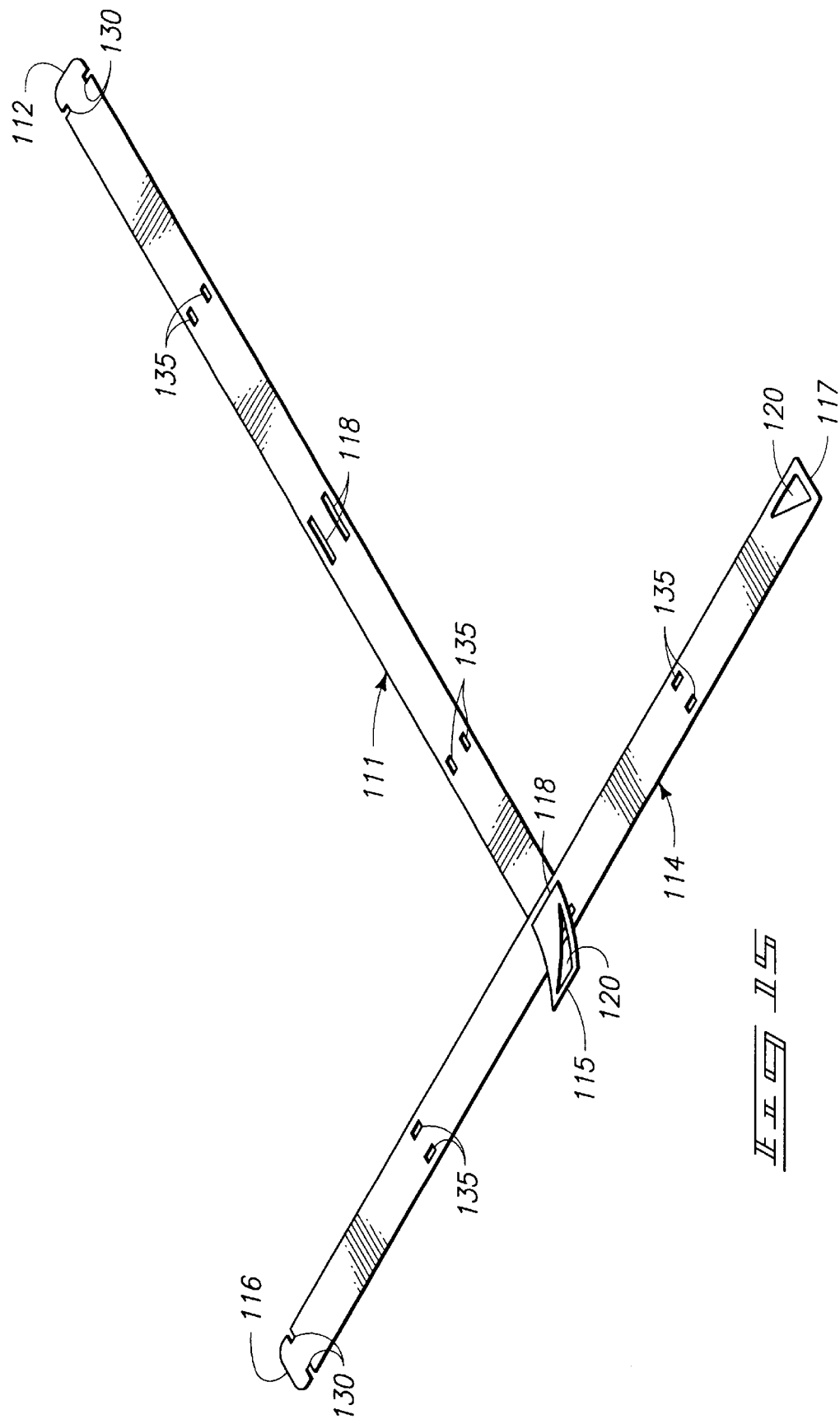
Figure 16:
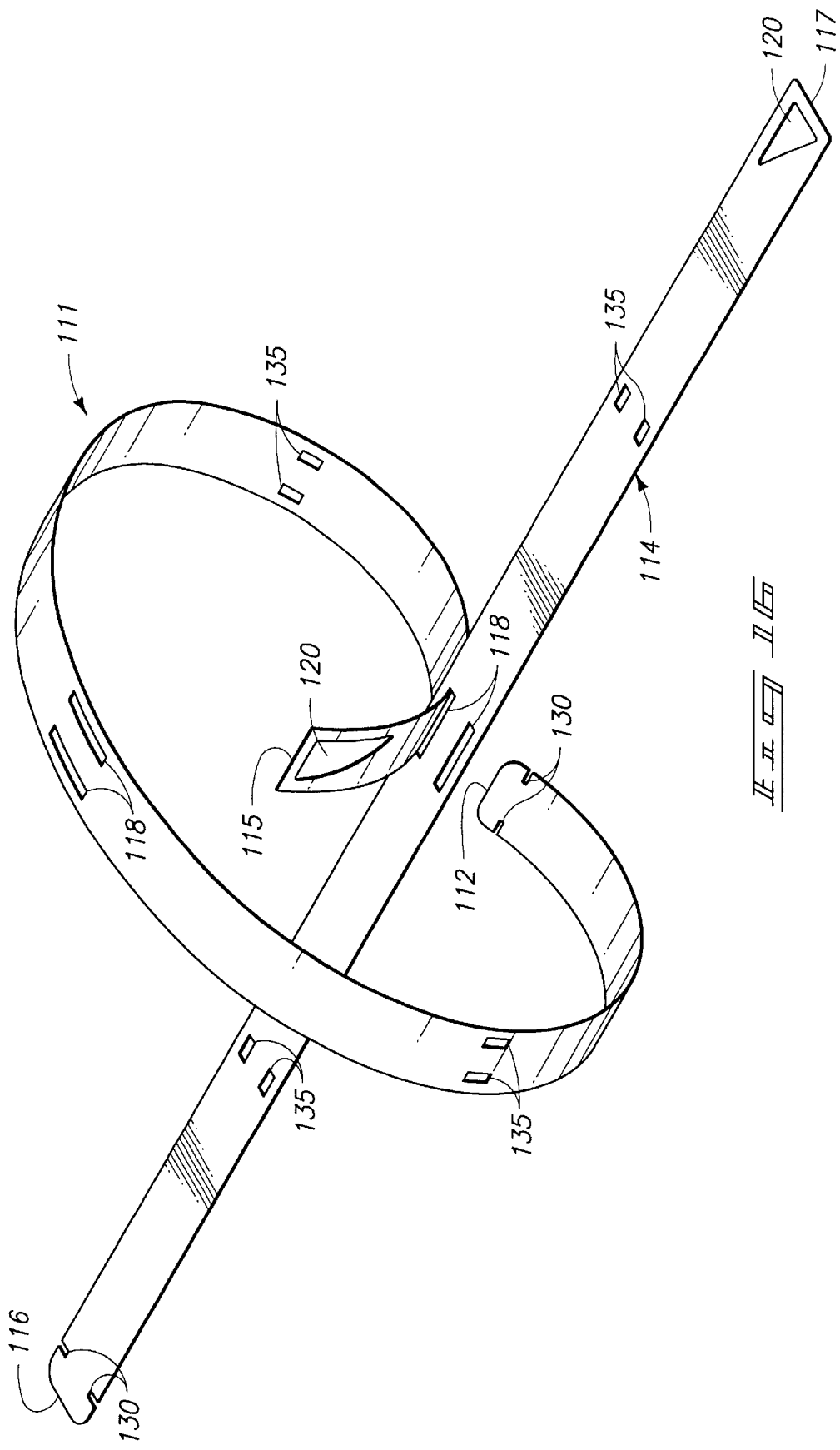
Figure 17:
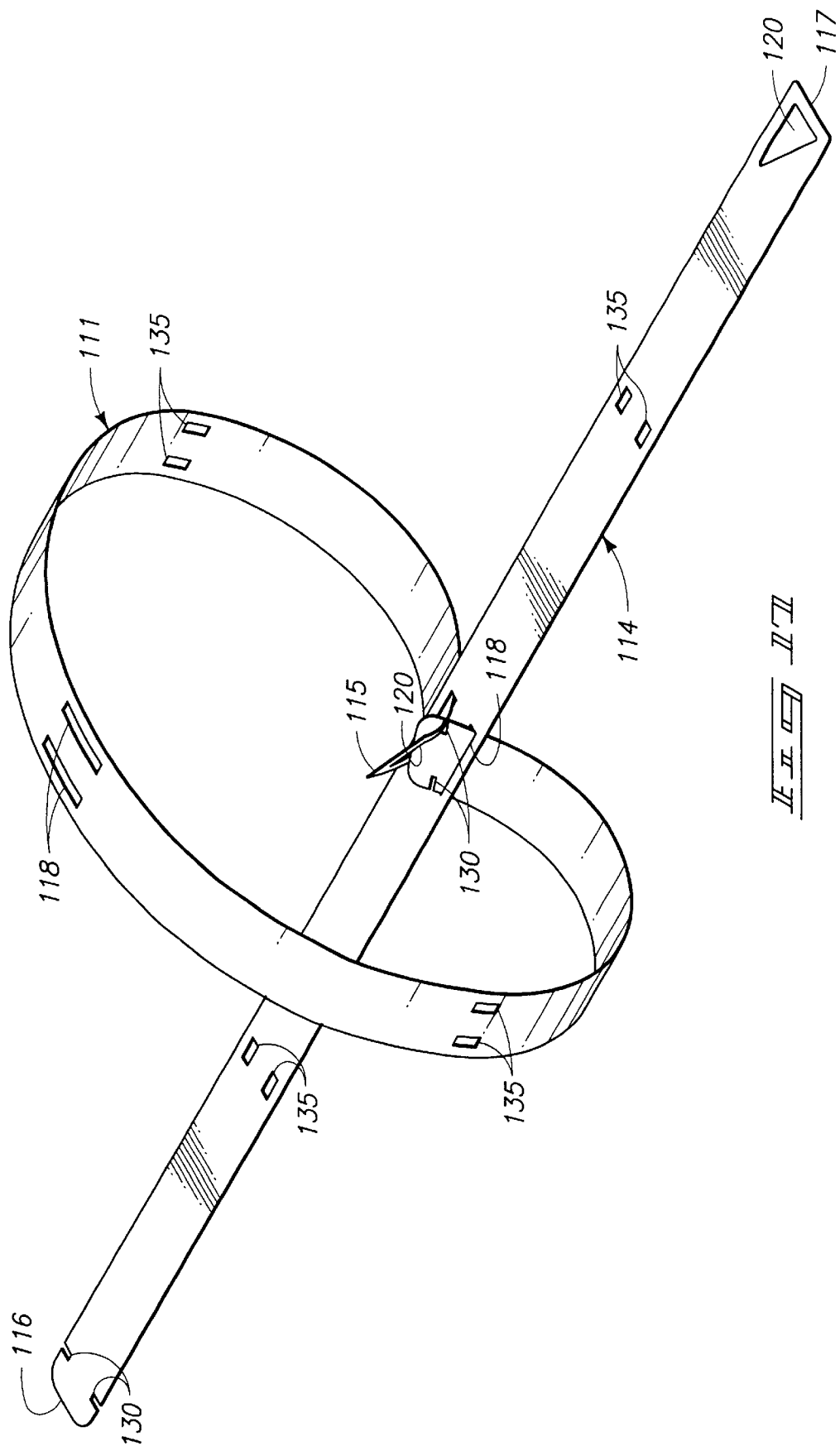
Figure 19:
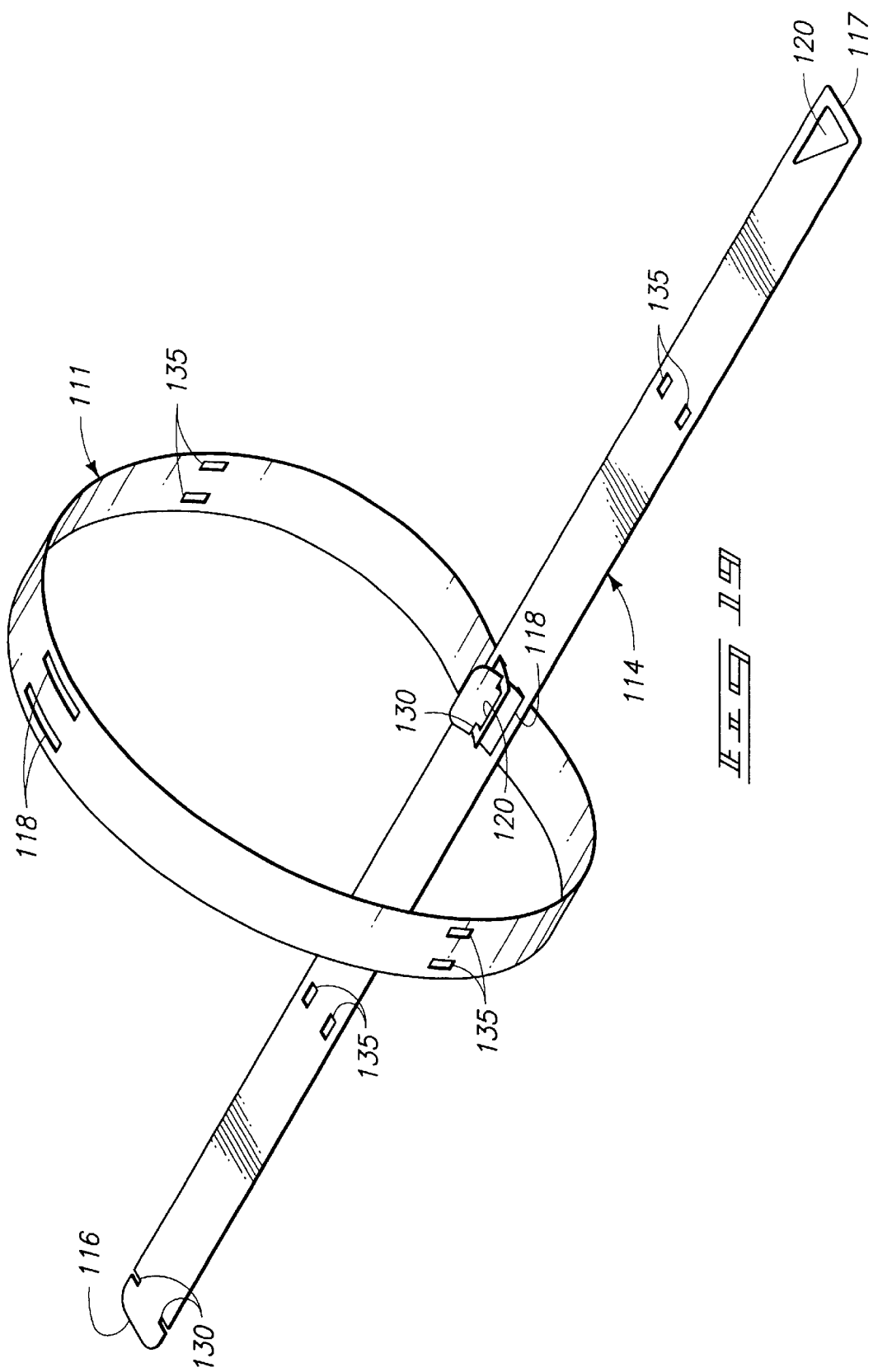
Figure 22:
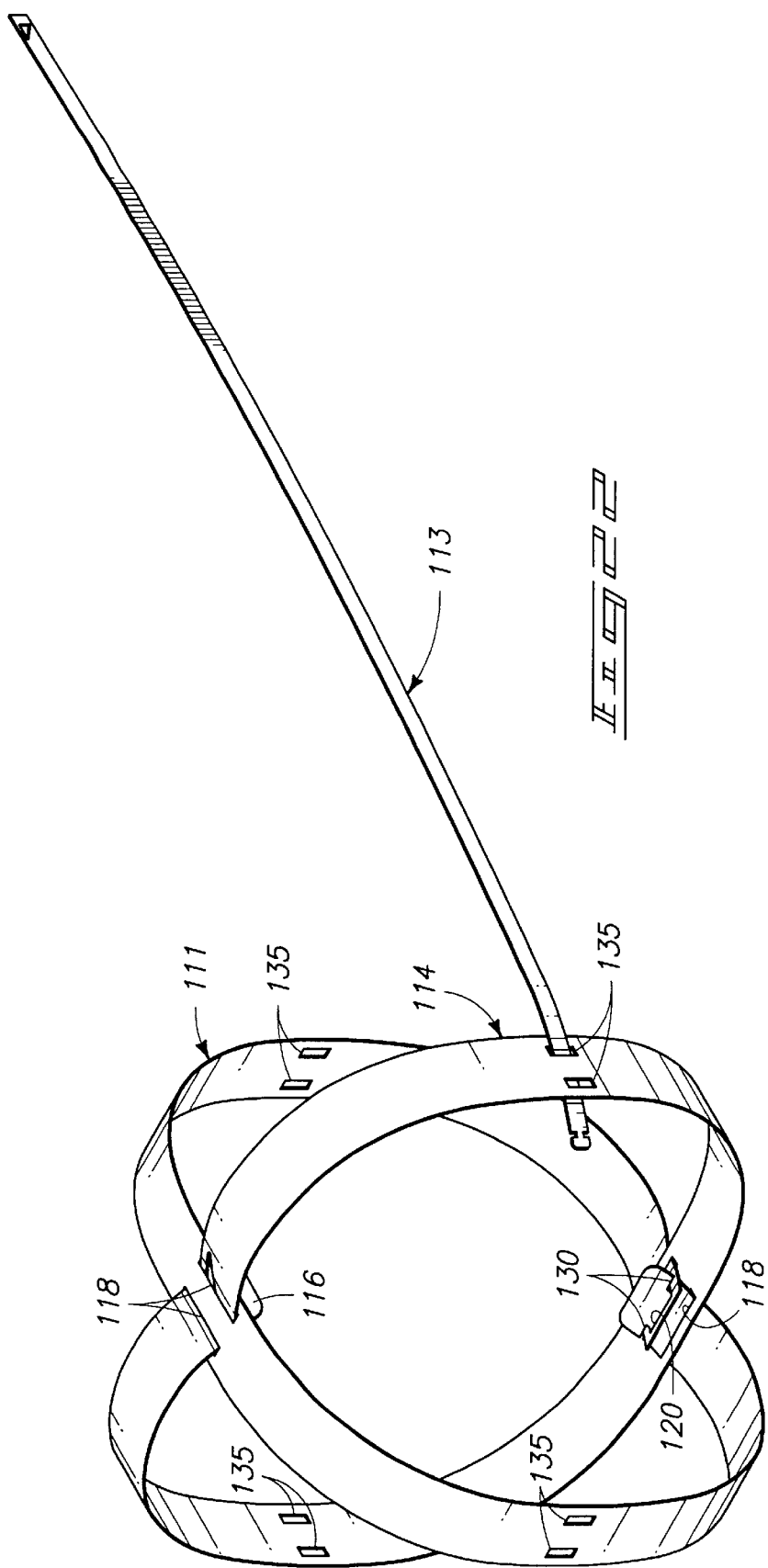

The baffle configuration shown in the FIG. 11 example, may be assembled as suggested by the succession of figures starting at FIG. 14 and extending through FIG. 22. As shown in FIG. 14, the first and second strips are oriented perpendicular to one another. One strip 111 is threaded through the central slots 118 of the other strip 114 substantially as shown in FIG. 15, and the opposite end is drawn around as shown in FIG. 16 and inserted through the adjacent slot 118. Then, as shown substantially by FIGS. 17 and 18, the adjacent ends of the strip are twisted and interfitted so the joint members become substantially locked as shown in FIG. 19.

Figure 20:
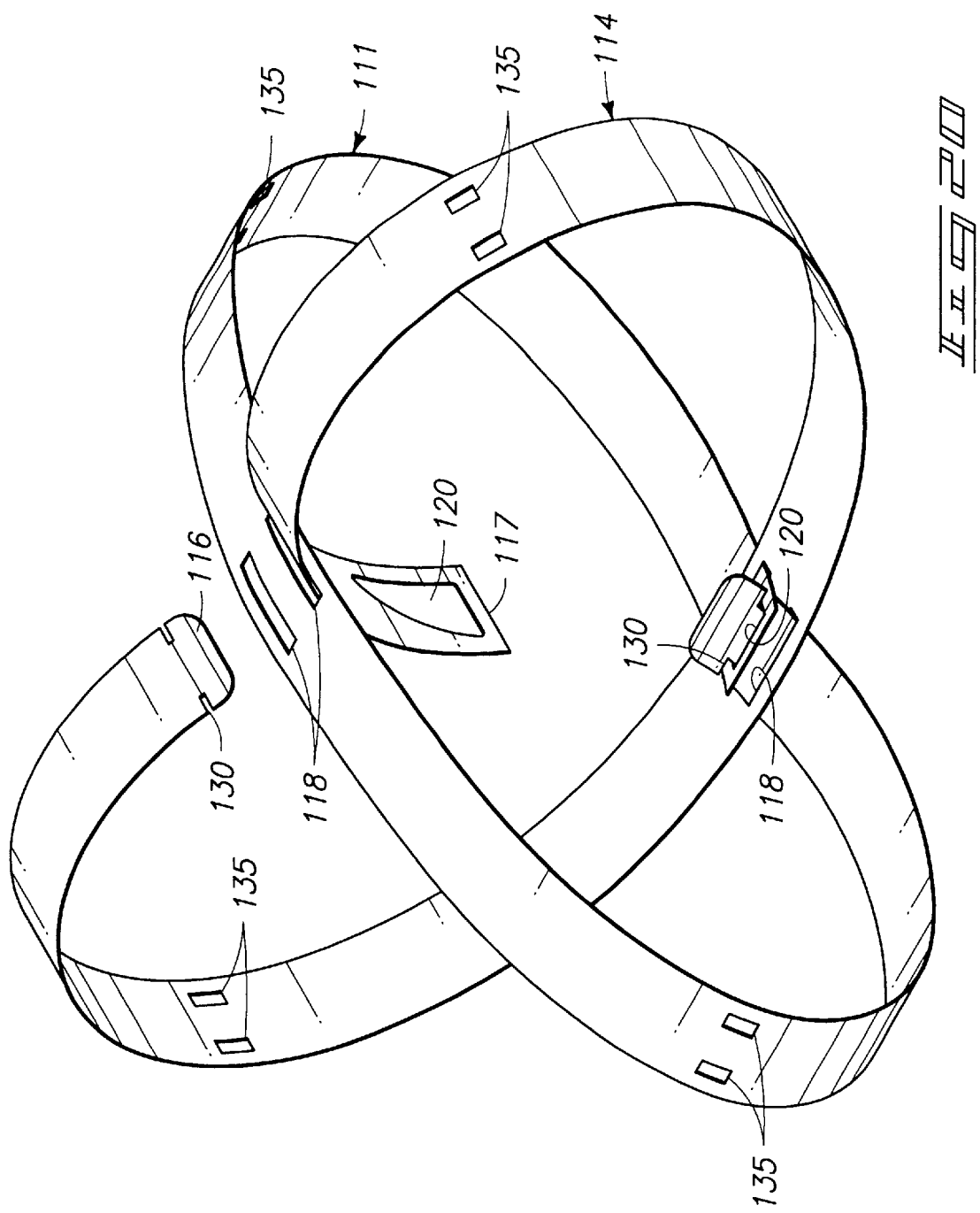
Figure 21:
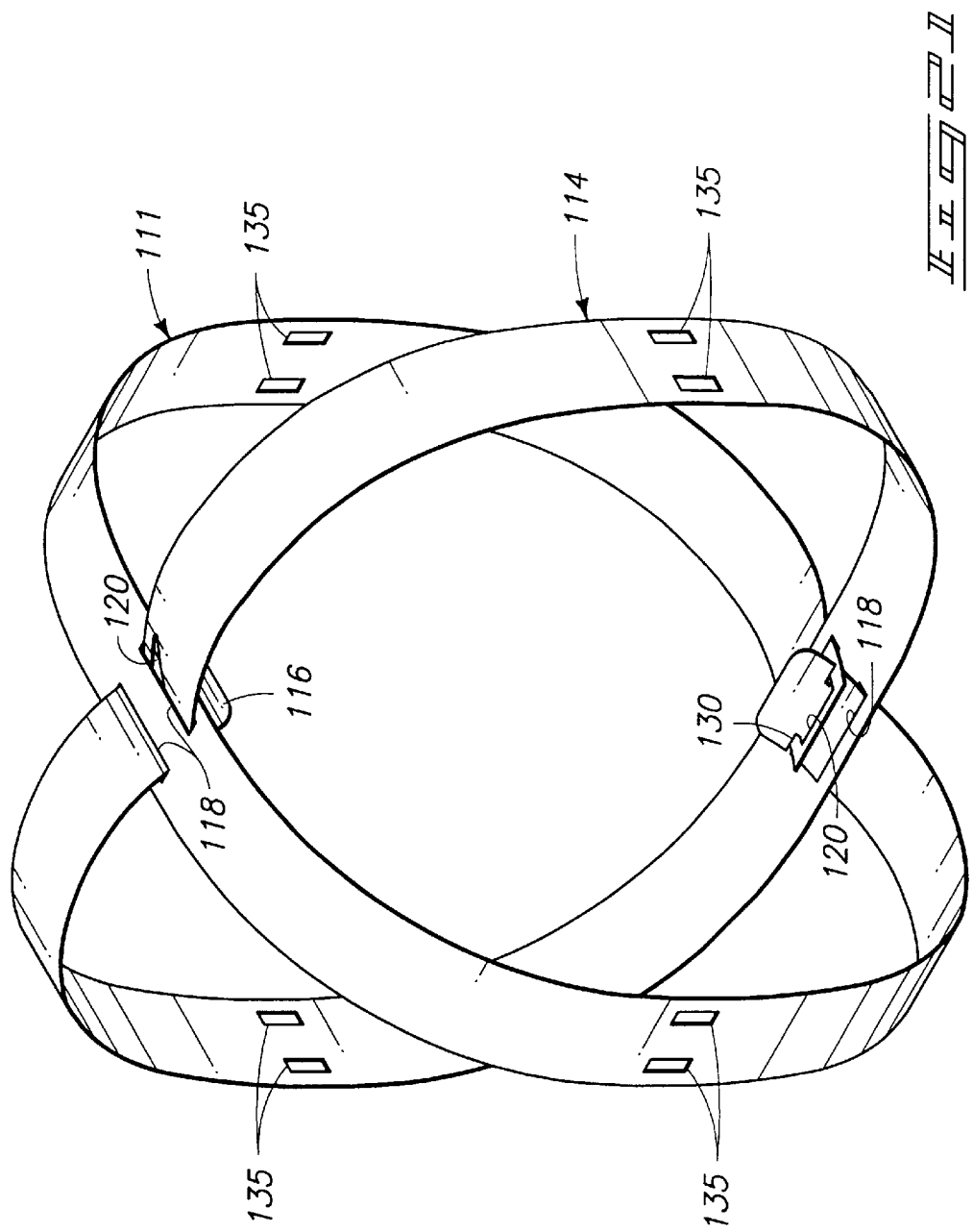

Next, the remaining strip 114 is folded and inserted through the central slots 118 of the earlier formed loop substantially in a manner shown in FIG. 20. The two ends are then joined together at the inside of the loop configuration in a manner described above and as shown in FIGS. 17 and 18. We now have a baffle 10 as shown in FIG. 21, comprised of the two loops.

If desired, the third strip 113 may be attached by interleaving the length thereof through the appropriate slots 135 formed in the first and second strips. This step is shown in the initial stages at FIG. 22. The third strip is pulled through and interwoven with the slots 135 to a point where its ends are situated substantially as shown in FIG. 11. The ends are joined together in the manner described for the first and second loops. This completes a baffle 10 using first, second and third loops as shown in FIG. 11.

Figure 23:
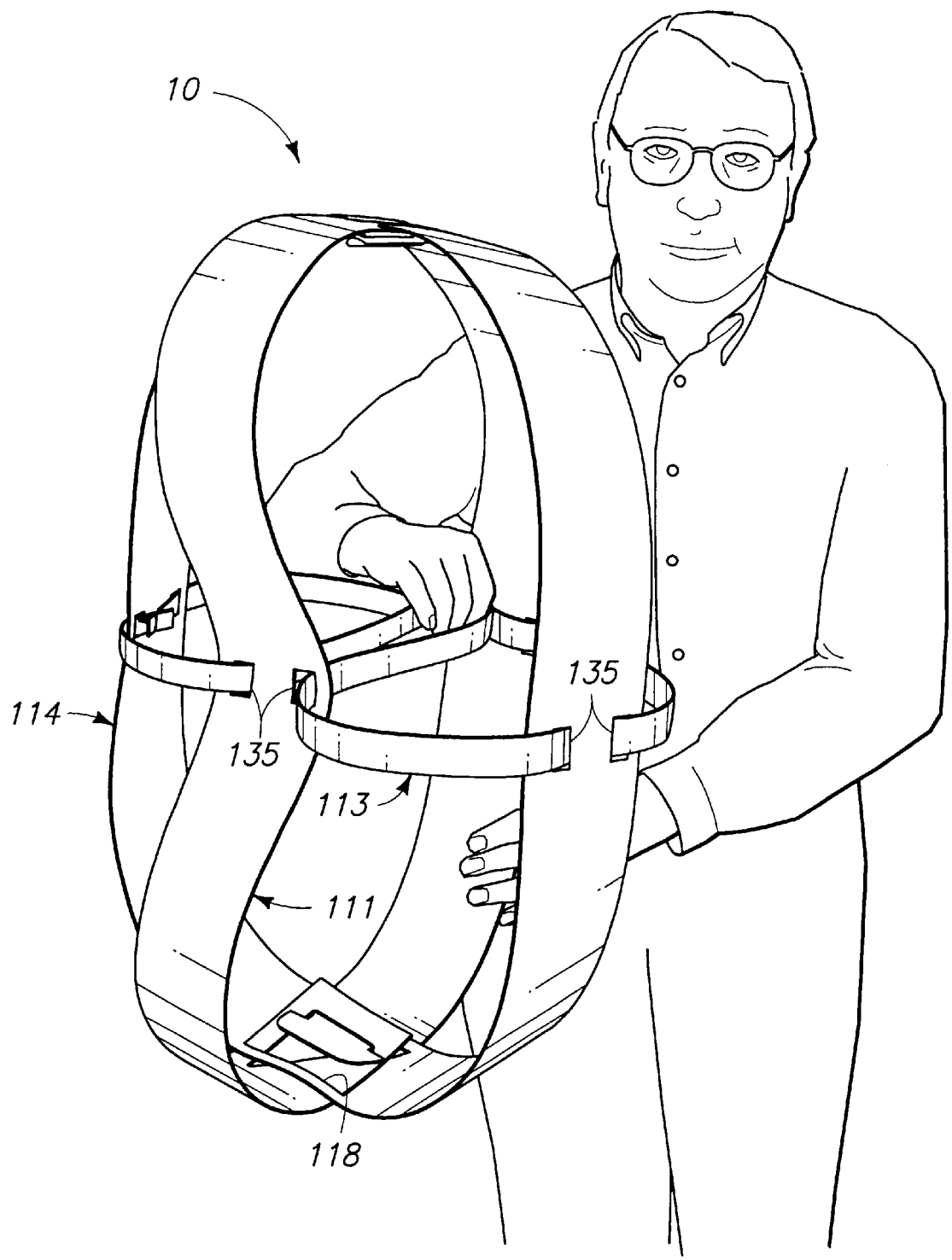
FIG. 23 is a view illustrating how a baffle can be compressed for installation in a container such as a tank that has an access opening that is smaller than the baffle diameter.
Figure 24:
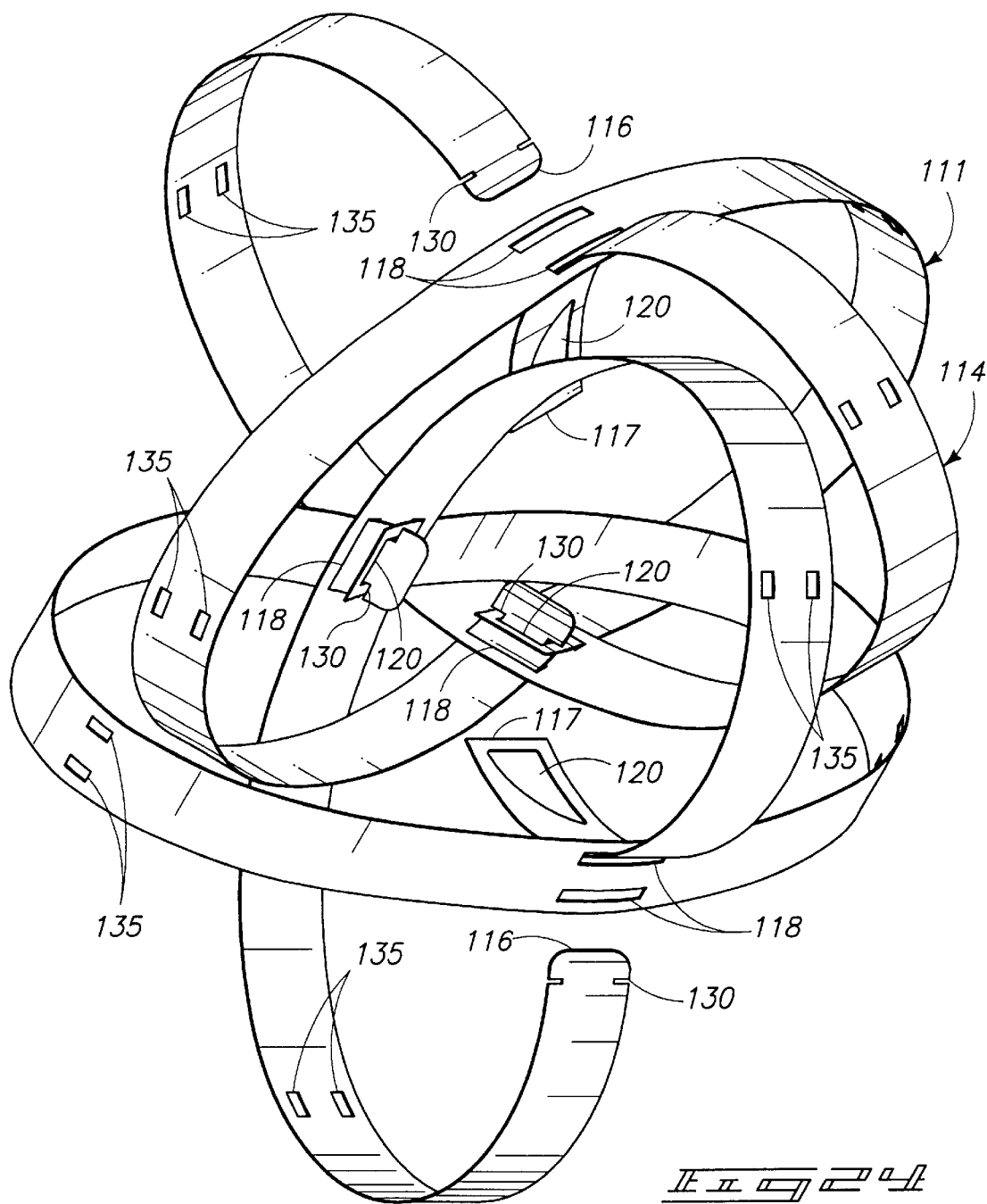
FIG. 24 is a view illustrating an assembly of partially interlinked components of two baffle units.
Figure 25:
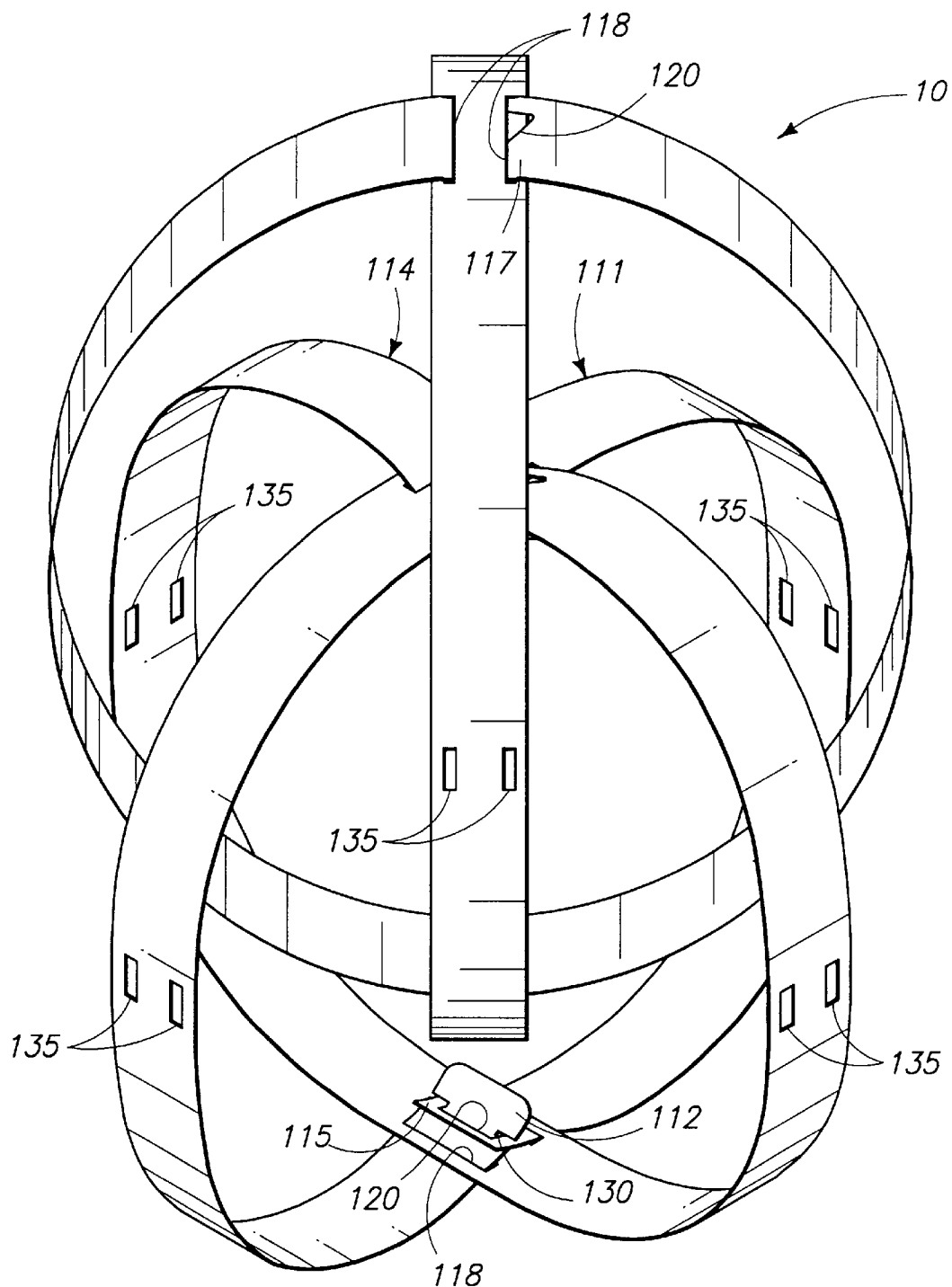
FIG. 25 is a view illustrating the two baffle units of FIG. 24 linked together.
Figure 26:
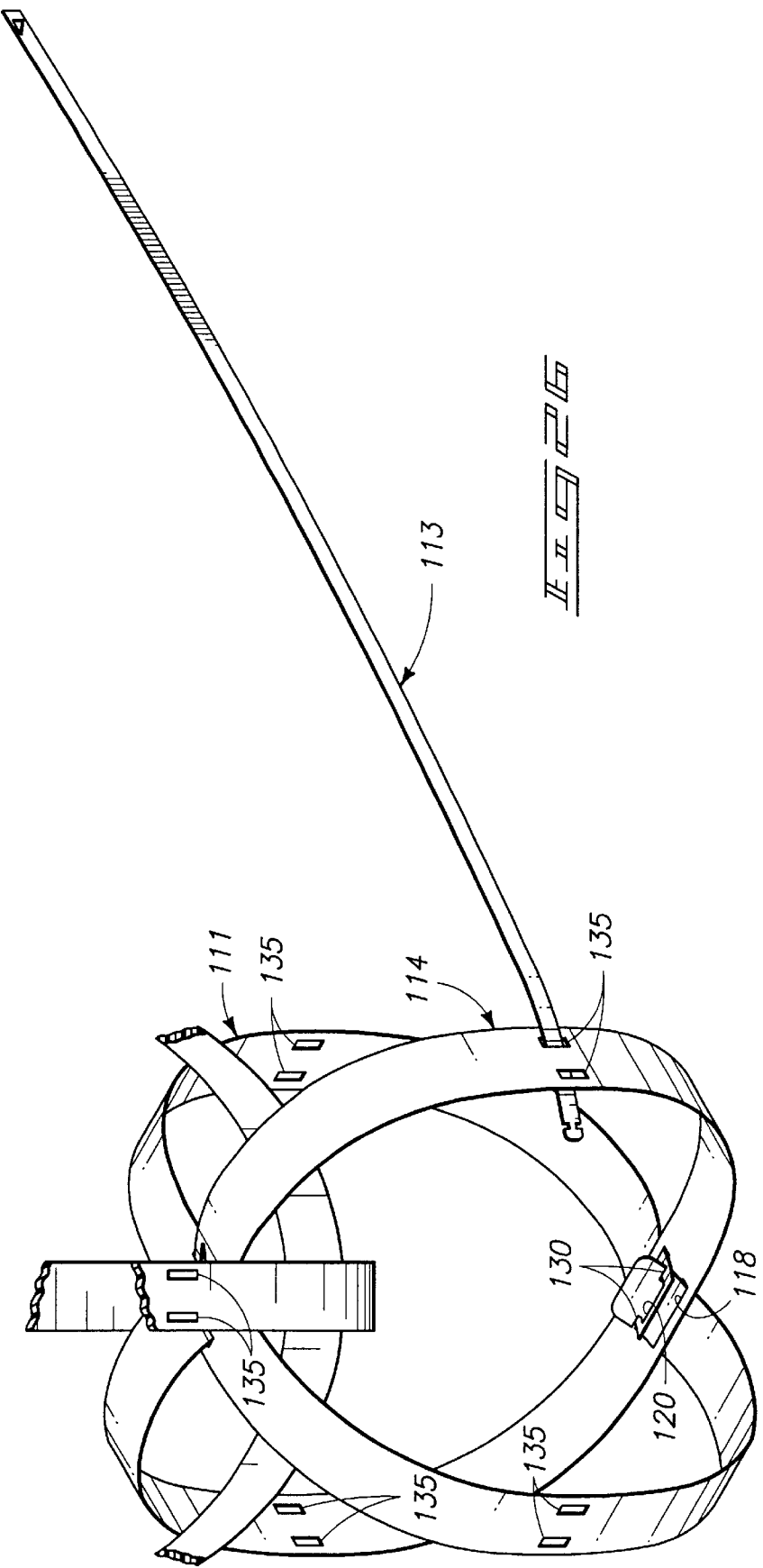
FIG. 26 is a view showing addition of a third loop to one of the baffle units.
Figure 27:
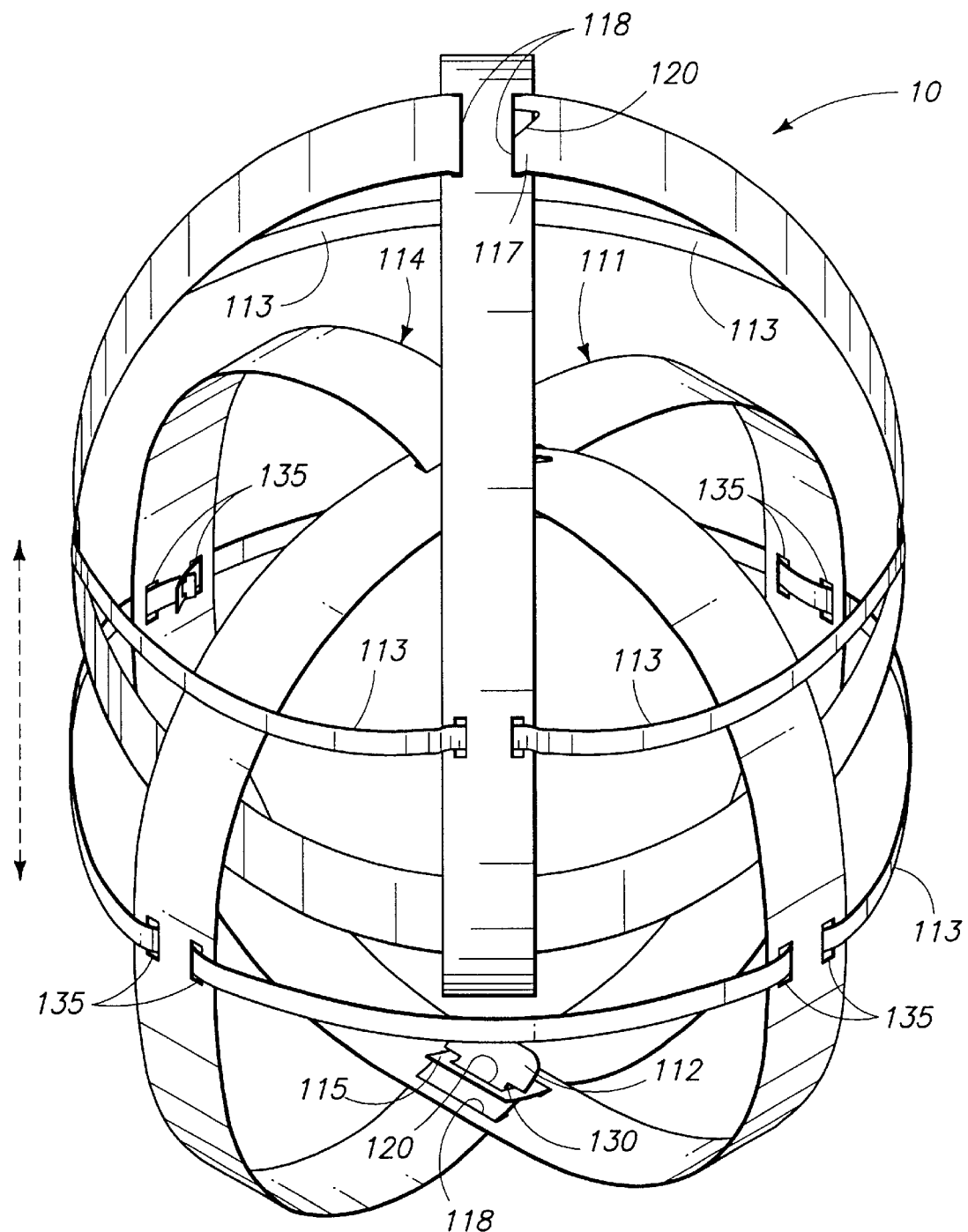
FIG. 27 is a view of two interlinked baffle units with third loops installed.

Another of the advantages gained from using the sliding connections for the baffle is shown in FIG. 23. The slidable nature of the loop configurations allows the third loop to be pulled through one of the sets of slots to allow compaction of the baffle. This compact configuration may be easily fitted through the opening of a storage tank or other arrangement.

The interfitting strip configurations are also advantageous since no fastening hardware need be supplied. Still further, the slidable nature of the individual parts of the loop allow for a more resilient flexibility of the entire baffle and, therefore, enable more buffering or energy-absorbing capability.

A baffle 10 formed as exemplified above have certain advantages in use especially in tanks as shown in FIG. 3. A number of the baffles may be formed as described above and then be pressed through an opening in a tank and into the tank interior.

FIG. 3 shows several baffles 10 in the illustrated tank. However, it may be preferable that the tank be filled with baffles, with successive baffles engaging and slightly compressing one another. Wave or sloshing action of the liquid against the baffle elements will cause the elements to resiliently compress or deflect. The baffles may thus absorb the force of the shifting liquid and effectively baffle or dampen such motion.

The third loops function during this time to prevent the baffles from nesting together, even if compressed. Thus, the resiliency of the various loops within the individual baffles is maintained to react against and stabilize the liquid.

A strand of the baffles may be joined by a cord, cable, or rod as suggested in the applications incorporated by reference herein, for use outside tanks, as wave breaks or as buffers against a seawall or earthen embankment to ameliorate erosion caused by current and wave action.

In a further example, a system baffle units may be formed in a succession without the use of a cord, cable or rod interconnection. Reference is made to the example set forth in FIGS. 24–27. Such a system may be made up by at least one of the strips of one baffle unit being linked through at least one of the loops of a successive adjacent baffle unit, whereby the baffle units are linked together in succession.

In the illustrated example, both loops of one baffle unit are linked through both loops of at least one successive baffle unit. The strips themselves act to loosely hold the interlinked baffle units together in a strand or other desired interlinked arrangement.

It is pointed out that all forms of the baffle exemplified herein may be interlinked in the illustrated manner. It is further pointed out that the interlinked baffle units may be made up of two or three loops or combinations thereof. For example, a single strand or pattern of interlinked baffle units could be made up of only two loop baffles, only three loop baffles, or a combination of two and three loop baffles.

It is further pointed out that the baffle units may be made up using fastener or joint arrangements that are illustrated herein in any combination, or with further known fastening techniques, as suggested above. For example, the first two loops could be connected in the preferred manner illustrated in FIGS. 11–22, and a third loop could be attached using another form of fastener such as those exemplified in FIG. 6. Other combinations could also be used: in the single baffle units, in cord or otherwise connected strands, or in the interlinked arrangement suggested in FIGS. 24–27.

Thus, the baffles may be configured in strands or matrix configurations not only for use in tanks, but for placement in other areas where stabilization of liquid is desired as for example along beaches, stream embankments, seawalls, piers, dams, or other selected environments. The loops will flex almost indefinitely without observable wear, between the engaged surface and the wave or current forces, while protecting the adjacent surface against erosion.

An interlinked strand of the baffles may also be used as a wave break in open water, to calm an enclosed water surface within a swimming, boat docking or other area where calm water is desired. The strand is placed along a desired line or lines about the perimeter of the area. One of the loops in each cruciform shape will always be at least nearly horizontal (parallel to the water surface) and the remaining strip (of the cruciform shape) may be used to resiliently bolster the horizontal baffle against deformation due to wave action.

In all the situations exemplified above, third loops may be provided in any of all of the baffle units to prevent the baffles from nesting together. Further, the third loops add resiliency or yieldable resistance to deformation according to the thickness and construction material of the third loop.

It is pointed out that the present baffles may be provided in a kit form (see FIGS. 5 and 13). With this arrangement, the a large number of baffles may be easily transported and stored prior to use. The kit may be easily transported in extremely compact condition and stored in confined areas until such time that assembly and use is desired. The kit form is especially beneficial for areas needing a form of emergency readiness, for example against potential embankment erosion damage due to periodic flash flooding.

In another example, a farmer using the baffles in a chemical spray tank may obtain a sufficient number of the strips to effectively baffle the tank by assembling and then pressing one baffle after another (either individually as shown in FIG. 3, or a number of the baffles may be threaded along a common link) into the tank until desired baffling is obtained. Similarly, a resort operator could assemble one or more strands of linked baffles into a strand to cordon off a desired swimming or docking area, simply by adding successive baffles along one or more links until a desired strand length is obtained.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A liquid stabilizing baffle, comprising:
   first and second loops each being formed by a strip of flexible spring-like material; and
   wherein the first and second loops are joined together and intersect one another at two intersection points along an axis.

2. The liquid stabilizing baffle of claim 1, wherein the first and second loops are locked against rotation about the axis.

3. The liquid stabilizing baffle of claim 1, wherein the first and second loops are locked against rotation about the axis; and wherein a third loop is connected to the first and second loops.

4. The liquid stabilizing baffle of claim 1, wherein the first and second loops are formed of plastic material.

5. The liquid stabilizing baffle of claim 1, wherein a third loop is interwoven with the first and second loops.

6. The liquid stabilizing baffle of claim 1, wherein the first and second loops are fastened together at points where the loops intersect.

7. The liquid stabilizing baffle of claim 1, further comprising fastener members that interconnect the loops at points where the first and second loops intersect.

8. The liquid stabilizing baffle of claim 1, wherein the first and second loops intersect at substantially right angles and are formed about an approximate common point.

9. The liquid stabilizing baffle of claim 1, wherein:
   each loop is formed of polyethylene plastic material;
   the first and second loops are formed substantially about a common center point, with each at an approximate radius from the center point; and
   each of the loops includes longitudinal side edges that are separated by a width dimension less than the radius.

10. The liquid stabilizing baffle of claim 1, wherein:
    the first and second loops are formed about a substantially common center point with each at an approximate radius from the center point; and
    wherein each of the loops includes longitudinal side edges that are separated by a width dimension not substantially greater than approximately 0.6 times the radius.

11. A liquid stabilizing baffle, comprising:
    first and second substantially circular loops formed about an approximate center point and joined to one another at intersection points along an axis;
    each of the first and second loops being formed of flexible spring-like strips at a radius from the approximate center point;
    the first and second loops each including substantially annular side edges spaced apart by a width dimension;
    each of the first and second loops further including substantially concentric annular outer and inner surfaces joining the substantially annular side edges and spanning the width dimension;
    wherein the inner and outer surfaces of each first and second loop are spaced apart radially with respect to the approximate center point by a thickness dimension;
    wherein the thickness dimension is less than the width dimension and the width dimension is less than the radius; and
    fasteners joining the first and second loops in intersecting, substantially concentric relation, forming a hollow spheroidal cruciform configuration.

12. The liquid stabilizing baffle of claim 11, wherein the first and second loops are formed of flexible plastic strips.

13. The liquid stabilizing baffle of claim 11, wherein a third loop is joined to and intersects the first and second loops.

14. The liquid stabilizing baffle of claim 11, wherein the width dimension of the first and second loops is no greater than approximately 0.6 times the radius.

15. The liquid stabilizing baffle of claim 11, wherein the first and second loops are formed of elongated flexible strips having opposed ends and wherein the ends of one strip meet to form the first loop and wherein said ends are disposed at a point of intersection with the second loop.

16. The liquid stabilizing baffle of claim 11, wherein the first and second loops are formed by two elongated strips of flexible spring like material with opposed transverse ends, and wherein ends of one strip are joined together to form one of the loops at an approximate mid point between ends of the other strip.

17. The liquid stabilizing baffle of claim 11, wherein a third loop is joined with the first and second loops and is connected to the first and second loops at pivot points.

18. A liquid stabilizing baffle, comprising:
    substantially circular first and second loops formed of flexible springlike plastic strips on substantially equal radii from a central point, the loops intersecting one another at angles to form a substantially three dimensional hollow spheroid cruciform configuration;
    the first and second loops each including substantially annular side edges spaced apart by a width dimension;
    the first and second loops each further including substantially concentric annular outer and inner surfaces joining the side edges and spanning the width dimension;
    wherein the inner and outer surfaces are spaced apart radially by a thickness dimension;
    wherein the thickness dimension of each loop is less than the width dimension thereof and the width dimension is less than the radius thereof;
    wherein each strip is elongated between opposed ends and wherein the ends of one strip are joined together with the other strip at a point thereon approximately midway between ends of said other strip.

19. The liquid stabilizing baffle of claim 18 wherein the ends of said other strip are joined with the one strip at a point thereon approximately midway between the opposed ends thereof.

20. The liquid stabilizing baffle of claim 18 wherein a third loop is pivotably connected to the first and second loops.

21. A liquid stabilizing baffle, comprising:
first and second loops formed by a first and second elongated strips of flexible resilient material with each strip formed in a loop configuration;
wherein the first and second loops are interlinked with one another at two intersection points along an axis, forming a substantially hollow spheroidal cruciform configuration.

22. The liquid stabilizing baffle of claim 21 wherein the strips include joined ends that are interlinked by fasteners.

23. The liquid stabilizing baffle of claim 21 wherein the first and second loops are connected by fasteners which include male and female latch members.

24. The liquid stabilizing baffle of claim 21 wherein the first and second loops are connected by fasteners that extend through the first and second strips at points adjacent the intersections thereof.

25. The liquid stabilizing baffle of claim 21, further comprising a third loop with opposed interlinked ends formed around and joined with the first and second strips.

26. The liquid stabilizing baffle of claim 21 further comprising a third loop interlaced with the first and second loops through link members formed by third loop receiving slots formed in the first and second strips.

27. The liquid stabilizing baffle of claim 21 wherein the first and second strips include opposed ends and link members comprised of paired central slots, shaped to slidably receive the first and second strip ends.

28. The liquid stabilizing baffle of claim 21 wherein the first and second loops each include one end with a triangular opening and another end with a latch member releasably received through and interlocked within the triangular opening.

29. The liquid stabilizing baffle of claim 21 wherein:
each strip is formed of a flexible, resilient plastic material;
the first and second loops are formed substantially about a common center point, with each at an approximate radius from the center point; and wherein
each of the strips includes longitudinal side edges that are spaced apart by a width dimension that is less than the radius, and further include inward and outwardly facing surfaces that define strip thickness dimensions that are less than the width dimensions.

30. The liquid stabilizing baffle of claim 21 wherein each of the first and second strips include longitudinal side edges that are separated by a width dimension and further comprising a third loop intersecting and joined with the first and second strips, and wherein the third loop includes a width dimension that is less than the width dimension of the first and second strips.

31. The liquid stabilizing baffle of claim 21 wherein the first and second strips include paired third loop receiving slots and wherein a third loop is interlaced through the paired slots.

32. The liquid stabilizing baffle of claim 21 in which joint members are provided at ends of the first and second strips, for releasably securing the ends together, and in which link members are provided on the first and second strips, with the link members on the first strip slidably receiving the joint members of the second strip.

33. A liquid stabilizing baffle kit, comprising component parts that include:
first and second elongated strips of flexible resilient material, having width dimensions between longitudinal side edges, and thickness dimensions between opposed inner and outer surfaces;
the strips including opposed strip ends; and
fasteners configured to join the strip ends together in intersecting resilient loops with the thickness dimensions oriented radially and with the width dimensions substantially tangential.

34. The kit of claim 33, further comprising a third strip; and
mounting members adapted to connect the third strip in a third loop configuration to the first and second loops.

35. A liquid stabilizing baffle system, comprising:
a succession of baffle units, each unit formed of first and second elongated strips of flexible resilient material having width dimensions between longitudinal side edges, and thickness dimensions between opposed inner and outer surfaces;
the strips of each baffle unit being formed in intersecting loops that are joined to form substantially hollow spheroid cruciform configurations; and
wherein at least one of the strips of one baffle unit is linked through at least one of the loops of a successive adjacent baffle unit, whereby the baffle units are linked together in succession.

36. The system of claim 35 wherein both loops of one baffle unit are linked through both loops of a successive adjacent baffle unit.

* * * * *

UNITED STATES PATENT AND TRADEMARK OFFICE
CERTIFICATE OF CORRECTION

PATENT NO. : 6,431,388 B1
DATED : August 13, 2002
INVENTOR(S) : Spickelmire et al.

It is certified that error appears in the above-identified patent and that said Letters Patent is hereby corrected as shown below:

Column 7,
Line 62, replace "and a three loop baffle this are shown sequentially in FIGS." with
-- and a three loop baffle are shown sequentially in FIGS. --

Column 8,
Line 64, replace "preferably oriented substantially perpendicularly to the first" with
-- preferably be oriented substantially perpendicularly to the first --

Column 10,
Line 55, replace "provided in any of all of the baffle units to prevent the baffles" with
-- provided in any or all of the baffle units to prevent the baffles --
Line 61, replace "the a large number of baffles may be easily transported and" with -- a large number of baffles may be easily transported and --

Signed and Sealed this

Thirty-first Day of August, 2004

JON W. DUDAS
*Director of the United States Patent and Trademark Office*